United States Patent
Ståhl et al.

(10) Patent No.: US 12,069,045 B2
(45) Date of Patent: Aug. 20, 2024

(54) METHODS AND APPARATUS FOR ENABLING REMOTE MANAGEMENT OF A PROFILE IN AN IDENTITY MODULE

(71) Applicant: Telefonaktiebolaget LM Ericsson (publ), Stockholm (SE)

(72) Inventors: Per Ståhl, Klagshamn (SE); Qiang Li, Täby (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 17/642,380

(22) PCT Filed: Sep. 30, 2019

(86) PCT No.: PCT/EP2019/076408
§ 371 (c)(1),
(2) Date: Mar. 11, 2022

(87) PCT Pub. No.: WO2021/063475
PCT Pub. Date: Apr. 8, 2021

(65) Prior Publication Data
US 2022/0329586 A1    Oct. 13, 2022

(51) Int. Cl.
*H04L 9/40* (2022.01)
*H04W 4/50* (2018.01)
(Continued)

(52) U.S. Cl.
CPC ........... *H04L 63/0853* (2013.01); *H04W 4/50* (2018.02); *H04W 4/70* (2018.02); *H04W 8/205* (2013.01); *H04W 12/06* (2013.01)

(58) Field of Classification Search
CPC .................................................. H04L 63/0853
See application file for complete search history.

(56) References Cited

U.S. PATENT DOCUMENTS 10,178,690 B2 * 1/2019 Nader ..................... H04L 1/189
10,231,198 B2 * 3/2019 You ......................... H04W 48/12
(Continued)

FOREIGN PATENT DOCUMENTS

CN    109997334 A    7/2019
WO    2019113730 A1  6/2019
(Continued)

OTHER PUBLICATIONS

3rd Generation Partnership Project, "Technical Specification Group Core Network and Terminals; T8 reference point for Northbound APIs; (Release 15)", 3GPP TS 29.122 V15.3.0, Mar. 2019, pp. 1-274.
(Continued)

*Primary Examiner* — Simon P Kanaan
(74) *Attorney, Agent, or Firm* — Coats & Bennett, PLLC

(57) ABSTRACT

Embodiments described herein relate to methods and apparatuses for enabling remote management of a profile in an identity module in an NB-IoT device. A proxy server is configured with access to a database of one or more external identifiers associated with one or more respective NB-IoT devices, wherein the one or more external identifiers are used to address the respective one or more NB-IoT devices via an exposure function in a core network. A method in the proxy server comprises receiving a request to deliver a triggering message to the NB-IoT device, wherein the request comprises a device identifier; determining an external identifier based on the received device identifier; and delivering the triggering message to the NB-IoT device using the external identifier.

10 Claims, 23 Drawing Sheets

(51) Int. Cl.
*H04W 4/70* (2018.01)
*H04W 8/20* (2009.01)
*H04W 12/06* (2021.01)

(56) References Cited

U.S. PATENT DOCUMENTS

| | | | |
|---|---|---|---|
| 10,919,350 B2* | 2/2021 | Hall | B60D 1/30 |
| 11,297,660 B2* | 4/2022 | Li | H04W 76/10 |
| 2019/0028337 A1* | 1/2019 | Ryu | H04W 8/02 |
| 2019/0143771 A1* | 5/2019 | Hall | G06K 19/06037 |
| | | | 340/431 |
| 2019/0253875 A1* | 8/2019 | Vittal | H04W 8/08 |

FOREIGN PATENT DOCUMENTS

| | | |
|---|---|---|
| WO | 2019129368 A1 | 7/2019 |
| WO | 2019136044 A1 | 7/2019 |
| WO | 2019137630 A1 | 7/2019 |
| WO | 2019162678 A1 | 8/2019 |

OTHER PUBLICATIONS

3rd Generation Partnership Project, "Technical Specification Group Services and System Aspects; General Packet Radio Service (GPRS) enhancements for Evolved Universal Terrestrial Radio Access Network( E-UTRAN) access (Release 15)", 3GPP TS 23.401 V15.6.0, Dec. 2018, pp. 1-374.

3rd Generation Partnership Project, "Technical Specification Group Services and System Aspects; Architecture enhancements to facilitate communications with packet data networks and applications (Release 15)", 3GPP TS 23.682 V15.7.0, Dec. 2018, pp. 1-121.

GSM Association, "Remote Provisioning Architecture for Embedded UICC Technical Specification, Version 3.2", Official Document SGP.02, Jun. 27, 2017, pp. 1-309.

GSM Association, "RSP Technical Specification Version 2.2.1", Official Document SGP.22, Dec. 18, 2018, pp. 1-250.

* cited by examiner

METHODS AND APPARATUS FOR ENABLING REMOTE MANAGEMENT OF A PROFILE IN AN IDENTITY MODULE

TECHNICAL FIELD

Embodiments described herein relate to methods and apparatuses for enabling remote management of a profile to an identity module in a narrow band Internet of Things (NB-IoT) device. The remote management of the profile may comprise provisioning a profile to the NB-IoT device and/or updating or adjusting an existing profile.

BACKGROUND

Subscriber Identity Module (SIM) cards were commercially deployed in 1991 and, since then, have ensured secure, identifiable and authenticated access to mobile networks. Another benefit of the SIM form factor for consumers was that they could be swapped from device to device to upgrade hardware without losing names and numbers, since contacts were stored in the memory on the SIM card. The use of SIM cards also meant that consumers could swap their device to another mobile operator with ease.

Since their introduction, SIMs have reduced in size and increased capability with each new generation of cellular technology. However, in the emerging machine-to-machine (M2M) and Internet of Things (IoT) markets, there is a different service paradigm, where the physical removal and swapping of SIMs on large fleets of IoT devices—that are sometimes located very remote—becomes costly and cumbersome.

The challenge for most enterprises is that matching up the SIM card and device occurs at different points in an elongated and often complex supply chain. Enterprises use different (mobile) operators for different markets and, where possible, operators utilize their agreements with other operators to provide a seamless global connectivity. However, if the product needs to be sold into a different market or used in a fleet that operates on a different operator network, this may introduce new and costly logistical and lifecycle management issues for every SIM card issued by a new Mobile Network Operator (MNO). Additionally, if there was ever a need in the past to change the mobile operator during the life of the device, this historically always meant changing the SIM card, which incurred additional logistical and cost issues.

This increasingly difficult market need generated a solution: the remotely programmed identity module, for example an embedded SIM (eSIM) or, an Embedded Universal Integrated Circuit Card (eUICC). The eUICC is a small electronic chip, inserted and soldered onto the circuit board of a device during manufacture. This configuration of eUICC is known as the MFF2 form factor that removes the need for a SIM card holder, and consequently reduces the volume of space required for the SIM.

The eUICC may be programmed during manufacturing with an initial bootstrap profile provided by a mobile operator. The initial bootstrap profile may provide initial connectivity such that an operational profile may then be remotely provisioned to the eUICC. This means that the initial network operator connected to the SIM can be changed and reassigned. Alternatively, initial connectivity may be achieved via some other radio interface (e.g. via another device such as a computer) over which an operational profile may be remotely provisioned. This reprogramming and provisioning may be performed over the air, without any physical modification requirements, which may have huge benefits for enterprises.

The standards for eUICC have been established by Global System for Mobile Communications Association (GSMA), the international association of mobile network operators, initially for Machine to Machine (M2M) applications and more recently for consumer applications such as smartphones and wearables.

The single biggest benefit for Original Equipment Manufacturers (OEMs) of this eUICC technology is that it converts the SIM into a single SKU (Stock Keeping Unit). In other words, during manufacture the eUICC can be inserted into a device, like any other component, and then the eUICC can be provisioned later with the appropriate network operator profile, depending on where in the world the device is shipped to. This streamlines production processes and reduces costs for the entire lifecycle of the device, as well as reducing the barriers to more widespread use of cellular connectivity in IoT devices. The single SKU business model using a remotely provisioned identity module facilitates enterprises to simplify their logistics and lifecycle management of the connected product with only one common eUICC for their global product.

eUICC also provides an insurance policy against being held to "connectivity ransom" by any single operator for the duration of the device's life. The logistics of the eUICC process are simple, for example, the enterprise signs an initial contract with a mobile operator that includes the right to change operator at the end of the contract period if necessary. Then, at the end of the contract term, the enterprise has the flexibility to shop around for alternative connectivity offers, in terms of service and price, and the insurance option to possibly change operator.

The automotive market is one of the most advanced IoT markets and, a current requirement for automotive industry is that every connected car must be equipped with eUICC. For example, in Europe, the implementation of eCall legislation is driving the compulsory adoption of eUICC in every new car. However, throughout the global industry, the benefits of eUICC are being seen and rapidly adopted, e.g. in utility industry, smart manufacturing, energy industry, transport & logistics, etc. eUICC remote SIM provisioning is becoming more and more crucial for IoT use cases, device manufactures, service providers, and mobile network operators.

Narrowband IoT (NB-IoT) is a new 3GPP radio technology standard that addresses the requirements of the Internet of Things (IoT). The technology provides improved indoor coverage, support of massive number of low throughput devices, low delay sensitivity, ultra-low device cost, low device power consumption and optimized network architecture. NB-IoT is a new cellular radio access technology specified by 3GPP in Release 13 (now part of official 5G technology) to address the fast-expanding market for low power wide area connectivity. The mobile industry is now establishing NB-IoT as a global coverage solution that enables customers, such as application service providers, device makers, to deploy and operate their services worldwide.

SUMMARY

According to some embodiments there is provided a method, in a proxy server, for enabling remote management of a profile in an identity module in an NB-IoT device, wherein the proxy server is configured with access to a database of one or more external identifiers associated with one or more respective NB-IoT devices, wherein the one or more external identifiers are used to address the respective one or more NB-IoT devices via an exposure function in a core network. The method comprises receiving a request to deliver a triggering message to the NB-IoT device, wherein the request comprises a device identifier; determining an external identifier based on the received device identifier; and delivering the triggering message to the NB-IoT device using the external identifier.

According to some embodiments there is provided a method in a Device and Connectivity Management, D/C, server, for enabling remote management of a profile at an identity module in a Narrow Band Internet of Things, NB-IoT, device. The method comprises transmitting a request to a proxy server to deliver a triggering message to the NB-IoT device, wherein the request comprises a device identifier and the triggering message.

According to some embodiments there is provided a method in a Narrow Band Internet of Things, NB-IoT, device for enabling remote management of a profile at an identity module in the NB-IoT device. The method comprises receiving a triggering message delivered by a proxy server.

According to some embodiments there is provided a proxy server, for enabling remote management of a profile in an identity module in an NB-IoT device, wherein the proxy server is configured with access to a database of one or more external identifiers associated with one or more respective NB-IoT devices, wherein the one or more external identifiers are used to address the respective one or more NB-IoT devices via an exposure function in a core network. The proxy server comprises processing circuitry configured to: receive a request to deliver a triggering message to the NB-IoT device, wherein the request comprises a device identifier; determine an external identifier based on the received device identifier; and deliver the triggering message to the NB-IoT device using the external identifier.

According to some embodiments there is provided a Device and Connectivity, D/C, Management server for enabling remote management of a profile at an identity module in a Narrow Band Internet of Things, NB-IoT, device. The D/C Management server comprises processing circuitry configured to: transmit a request to a proxy server to deliver a triggering message to the NB-IoT device, wherein the request comprises a device identifier and the triggering message.

According to some embodiments there is provided a Narrow Band Internet of Things, NB-IoT, device for enabling remote management of a profile at an identity module in the NB-IoT device. The NB-IoT device comprises processing circuitry configured to: receive a triggering message delivered by a proxy server.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
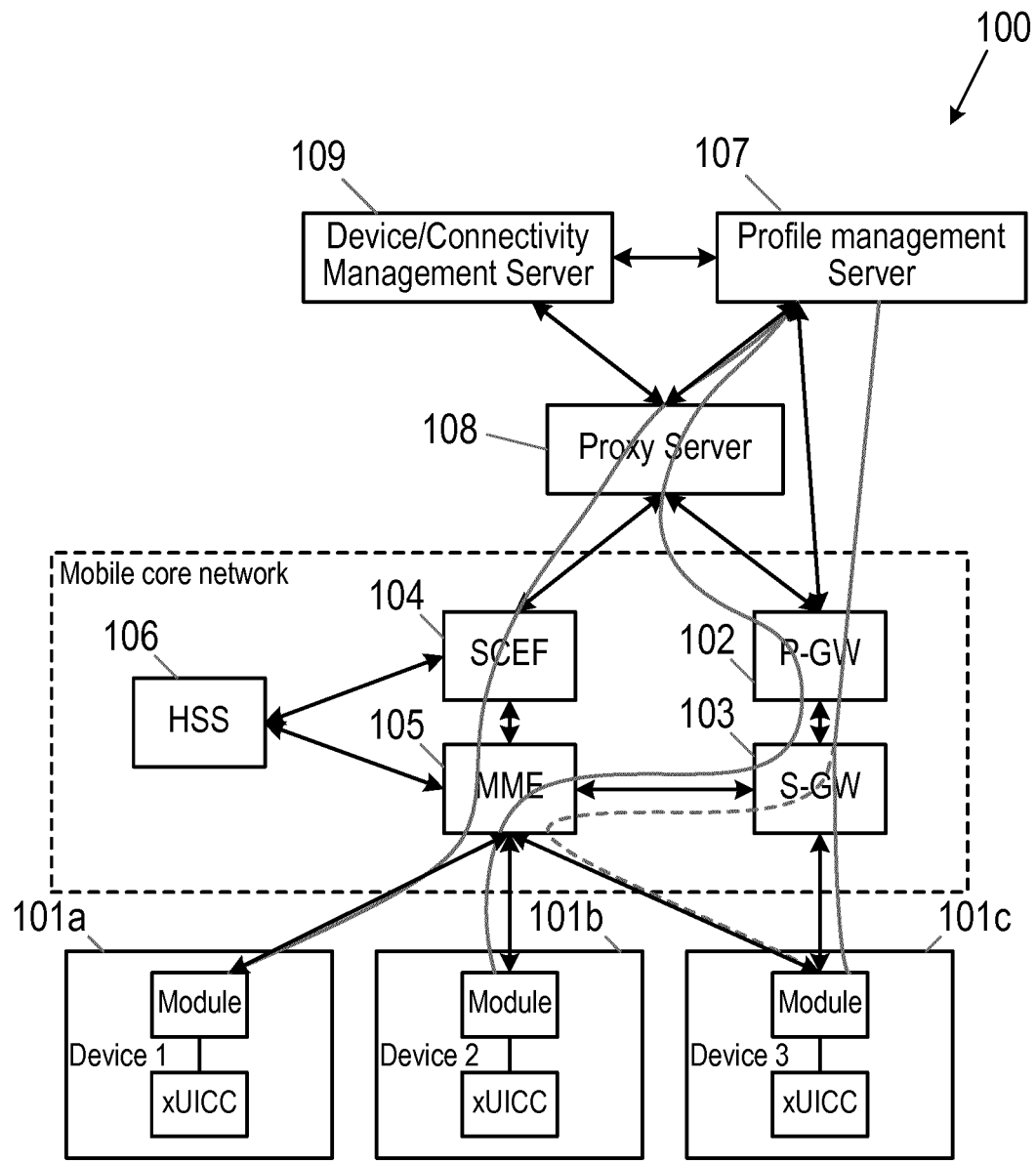
FIG. 1 illustrates a block diagram of a network 100 illustrating a plurality of nodes which may be used to manage a profile in an identity module in one or more different types of NB-IoT device.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

The remote provisioning of a profile to an identity module such as an eUICC may rely on the maturity of the GSMA technology—which is both a benefit and limitation. The trigger for remote provisioning actions is based on Short Message Service (SMS) and HyperText Transfer Protocol (HTTP) technology that has been around for decades, but is not always reliable, and is limited in its delivery capabilities, especially during roaming cases while the customers usually have a need to trigger a remote provisioning to download and enable a new local MNO profile on the eUICC. For example, where the first SMS trigger fails to deliver due to roaming SMS commercial issues or technical issues within the IoT context.

This results in failures of eUICC remote provisioning since the eUICC needs to receive the first SMS trigger to be able to start to download a new profile and/or to swap from one profile to the another. Besides the technical limitations of SMS, there is also commercial issue for using SMS, as every SMS comes with an extra cost, and there are currently a total four SMS required for each eUICC remote provisioning flow. The use of SMS therefore makes the current eUICC remote provisioning solution troublesome to scale for large number of IoT devices.

Most NB-IoT devices may only be configured to transmit and receive small data packets. For example, NB-IoT devices may be configured to transmit data packets that are small enough that, when transmitted over an Internet Protocol (IP) based protocol, the IP protocol overhead may far outweigh the actual data being exchanged. Such NB-IoT devices may be configured to exchange data with a server using a non-IP control-plane based data delivery method, i.e. NAS-based Non-IP Data Delivery (NIDD).

Since SMS and HTTP may not be supported on constrained NB-IoT devices, the existing eUICC remote provisioning methods may not be suitable for the majority of NB-IoT devices, and therefore the downloading of profiles and profile swapping may not be performed successfully.

However, in the worldwide IoT market, there are many large customers looking for to combine eUICC technology into their NB-IoT devices to achieve the low cost and global wide area connectivity. There is therefore demand for a new eUICC remote provisioning solution which can work in the NB-IoT network, and work with NB-IoT devices, despite the fact that SMS, HTTP, and roaming is not currently supported for NB-IoT.

Embodiments described herein therefore make use of a proxy server to enable remote management of a profile to an identity module (e.g. an eUICC) in an NB-IoT device.

Embodiments described herein propose to enable eUICC remote provisioning for constrained NB-IoT devices that rely on the GSMA remote SIM provisioning (RSP) standard.

The solution uses the Non-IP Data Delivery (NIDD) service offered by an exposure function in the core network (e.g. the Service Capability Exposure Function (SCEF) or a Network Exposure function (NEF)) to deliver profile download and profile management messages between a profile management server and the IoT device. The use of a NIDD service effectively allows for triggering profile management operations at the device and may also reduce the number of bits sent and received by the constrained IoT devices.

A proxy server may be used in between the profile management server and the exposure function of the NB-IoT network to avoid knowledge of 3GPP specific network related functions at the profile management server, and also to allow the IoT device to communicate with multiple application servers simultaneously. A Device/Connectivity (D/C) Management Server may control the business process, interacting with both enterprise customers and mobile network operators, enabling end to end communication flows/configurations, and initiating and manages the eUICC remote provisioning procedure.

Embodiments described herein may rely on roaming being supported for NB-IoT such that a NB-IoT device can connect, via a visiting network using a pre-provisioned profile (from a global mobile network operator) in the eUICC, to a profile management server in order to download and enable a new profile from a local mobile network operator. Today there is work ongoing by operators to try to agree on the business setup for NB-IoT roaming and it is here assumed such a setup is agreed.

Embodiments described herein consider different examples that address different setups of delivery technologies and device types, and that differ essentially in solution details but share a common approach. The differences in setups make that the solution may be crafted in a non-trivial way to achieve the goal. In one embodiment the remote provisioning according to the GSMA RSP M2M variant is used. In this case the exposure function NIDD service of the NB-IoT network may be used to deliver profile download and profile management messages that today are sent as SMS between profile management server and the eUICC of an IoT device. The NIDD solution may also be used in transferring other (non-SMS) profile download and profile management related messages between a constrained IoT device and the profile management server, thereby reducing the number of bits sent and received by the constrained IoT device. The NIDD service, in combination with Constrained Application Protocol (CoAP) or Reliable Data Service (RDS) protocol, may be used to exchange HTTPS messages in a reliable way via a proxy server between the device and the profile management server even though the device does not support an HTTP/TCP/IP stack.

In some embodiments, the remote provisioning according to the GSMA RSP consumer variant is used. Here the D/C Management Server may remotely control the profile download and profile management operations via a Local Profile Assistant (LPAd) in the NB-IoT device. In this case, the exposure function NIDD service may be used for triggering of profile download and profile management operations at the LPAd and transfer of profile download and profile management related messages between the NB-IoT device and the profile management server and D/C Management Server, thereby reducing the number of bits sent and received by the NB-IoT device. In some examples, remote provisioning according to GSMA RSP consumer variant adapted for IoT is considered, where the exposure function NIDD service provides a solution in a similar way.

Embodiments described herein also apply to integrated SIM (iSIM) solution where a device is equipped with an integrated UICC (iUICC) supporting GSMA Remote SIM Provisioning standard. Embodiments described herein may also apply to a (removable) UICC or an ETSI Smart Secure Platform (SSP) supporting the GSMA Remote SIM Provisioning standard.

The embodiments described herein allow existing GSMA RSP standards, in particular the M2M variant, to be used also for NB-IoT devices equipped with a standard M2M compliant eUICC, with only minimal changes required at the GSMA RSP compliant SM-SR. The issue of SMS not being supported by NB-IoT networks is circumvented by communication with the device using the exposure function NIDD service. The use of the exposure function, and a proxy server, also solves problems if a constrained IoT device does not support HTTP/TCP/IP stack. The use of NIDD technology may also minimize the number of bits sent and therefore also reduce power consumption for constrained devices.

FIG. 1 illustrates a block diagram of a network 100 illustrating a plurality of nodes which may be used to manage a profile in an identity module in one or more different types of NB-IoT device.

The NB-IoT devices may be considered to comprise a cellular NB-IoT modem and an identity module (for example an eUICC). The identity module may be configured to support remote SIM provisioning according to GSMA and may be equipped with credentials for remote profile download and profile management.

The NB-IoT networks may support roaming such that an NB-IoT device can connect, via a visiting network using a pre-provisioned profile (from a global mobile network operator) in the eUICC, in order to download and enable a new profile from a local mobile network operator.

In particular, FIG. 1 illustrates a first NB-IoT device 101a. NB-IoT device 101a comprises a first type of NB-IoT device. The first type of NB-IoT device comprises a device that uses the 3GPP Non-IP Data Delivery (NIDD) mechanism via an exposure function 104 (for example, SCEF in 4G or NEF in 5G) for communication with an application server. This first type of NB-IoT device may comprise either an non-IP device (e.g. a device that does not support the Transmission Control Protocol/Internet Protocol (TCP/IP) or User Datagram Protocol/IP UDP/IP protocol stack) or an IP-based device (e.g. a device supporting either the TCP/IP or UDP/IP protocol stack but that is using NIDD regardless, for example, in order to minimize the number of bits sent (which may therefore reduce the power consumption of the device)).

The network 100 further comprises a second NB-IoT device 101b. The NB-IoT device 101b comprises a second type of NB-IoT device. A second type of NB-IoT device comprises a device that uses the 3GPP Non-IP Data Delivery (NIDD) mechanism via a packet gateway (P-GW) 102 for communication with an application server. This second type of NB-IoT device may comprise either an non-IP device (e.g. a device that does not support the Transmission Control Protocol/Internet Protocol (TCP/IP) or User Datagram Protocol/IP UDP/IP protocol stack) or an IP-based device (e.g. a device supporting either the TCP/IP or UDP/IP protocol stack but that is using NIDD regardless, for example, in order to minimize the number of bits sent (which may therefore reduce the power consumption of the device)).

The network 100 further comprises a third NB-IoT device 101c. The third NB-IoT device 101c comprises a third type of NB-IoT device. A third type of NB-IoT device comprises an IP-based device that is configured to communicate with an application server using an NB-IoT IP-based service. The IP based traffic may for example, be sent via control plane signalling to, for example, a mobility management entity (MME) and further to a serving gateway (S-GW) 103 or be sent via a dedicated user plane bearer directly to S-GW and then further to P-GW 102.

The network 100 further comprises an exposure function 104. In this example, the exposure function 104 comprises a Service Capability Exposure Function (SCEF) which may be configured to expose services and capabilities of the 3GPP cellular network using a RESTful API for use by application servers. However, it will be appreciated that the exposure function 104 may similarly comprise a Network Exposure Function (NEF) according to a 5G core network architecture. The services exposed by the exposure function 104 may comprise the Non-IP Data Delivery (NIDD) service and monitoring service. An application server may, for example, utilize the NIDD service for communicating with NB-IoT devices of the first type above.

For example, an application server may communicate with the first NB-IoT device 101a using the NIDD service. When using NIDD, the first NB-IoT 101a device may transmit and receive messages (without use of IP), where these messages are conveyed as signaling data in a Non-Access Stratum (NAS) signaling protocol. NAS signaling may occur between the first NB-IoT device 101a and a Mobility Management Entity (MME) 105. The messages may then be relayed from the MME 105 to the exposure function 104. To use the exposure function's 104 services, an application server may first be required to register with exposure function 104 and may indicate the service it wants to use and for what device. Each NB-IoT device is assigned an external identifier or an MSISDN– that may be registered in a Home Subscriber Service (HSS) 106 together with other subscription details such as IMSI. The growth in the number of MTC devices in the next years will induce a shortage of phone numbers (i.e. MSISDN). The 3GPP solution is to define a new identifier as part of the subscription data and allow for operations whereby a MSISDN is not allocated by a new identifier is used instead. This new identifier is names "External Identifier. However, for simplicity, herein the term "external identifier" is to be understood to encompass an MSISDN. The external identifier may then be used by the application server to index the device it is targeting. Other examples of external identifier comprise a Car registration/VIN number, Smart meter serial No, QR code, etc.

The cellular network also offers the NIDD transport mode using a point-to-point tunnel via P-GW 102. For example, the second NB-IoT device 101b may be configured to transmit and receive messages (without use of IP), where these messages are conveyed as signaling data in the NAS signaling protocol between the devices and the MME 105. The messages may then be relayed further from MME 105 to S-GW 103 and further onto the P-GW 102. The P-GW 102 may act as a transparent forwarding node. For each NB-IoT device, the P-GW may have knowledge of an application server to which it shall forward packets to and from, based on the APN of PDN connection used by the NB-IoT device. The P-GW 102 may add UDP/IP headers into packets received from an NB-IoT device before forwarding them to an application server, and may remove any UDP/IP headers from packets received from the application server before forwarding them toward an NB-IoT device. The P-GW 102 may also assign an IP address and port to each NB-IoT devices for use in the communication with the application server.

The network 100 further comprises a profile management server 107. The profile management server may be used for profile provisioning and profile management operations (e.g. enabling, disabling, deleting of profiles). The tasks of a profile management server may be divided into different tasks performed by separate servers such as a provisioning server handling profile download and a management server handling profile management operation, for simplicity a single profile management server 107 is illustrated.

In examples in which NIDD is used to communicate with an NB-IoT device, the profile management server 107 may be registered/configured with the exposure function 104 or P-GW 102 and may therefore communicate via these nodes with the NB-IoT devices using NIDD. However, these NB-IoT devices may be required to communicate with other (application) servers in parallel to communicating with the profile management server 107. In order to allow for this parallel communication, a proxy server 108 is used in between. The proxy server 108 may be is registered/configured with the exposure function 104 or the P-GW 102 and traffic to and from a NB-IoT device may be transmitted to the proxy server 108 which may then forward messages generated by different NB-IoT devices to different application servers as appropriate.

Normally, a destination IP address and port are used by a proxy server to direct device generated messages towards the correct application server. However, here (without IP end-to-end) it may be up to the proxy server and applications at the NB-IoT device to coordinate such that the proxy server can connect traffic from one application at the NB-IoT device with the right application server. In addition to proxy services, the proxy server may offer other services (based upon SCEF services and other core network services) such as monitoring and notification services to application servers, including the profile management server. The remote management of a profile for an identity module in any of the NB-IoT devices 101a to 101c may therefore be managed via the proxy server 108.

An enterprise owning IoT devices (or NB-IoT devices) may order new cellular subscriptions (which may be referred to as profiles) for his IoT devices at a mobile network operator (MNO). The profiles may be prepared and made available for download at the profile management server 107. The enterprise may receive from the MNO a set of profile identifiers identifying the prepared profiles. Examples of profile identifiers are an Integrated Circuit Card Identifier (ICCID, international mobile subscriber identity (IMSI), an activation code (AC), and a matching ID. The enterprise may then utilise a Device and Connectivity (D/C) Management Server 109 to trigger profile download at the identity module of one of the IoT devices owned by the enterprise, and/or to trigger profile management operations on already downloaded profiles. The D/C Management Server 109 may comprise a device management server but may also be a server handling connectivity management.

Figure 2:
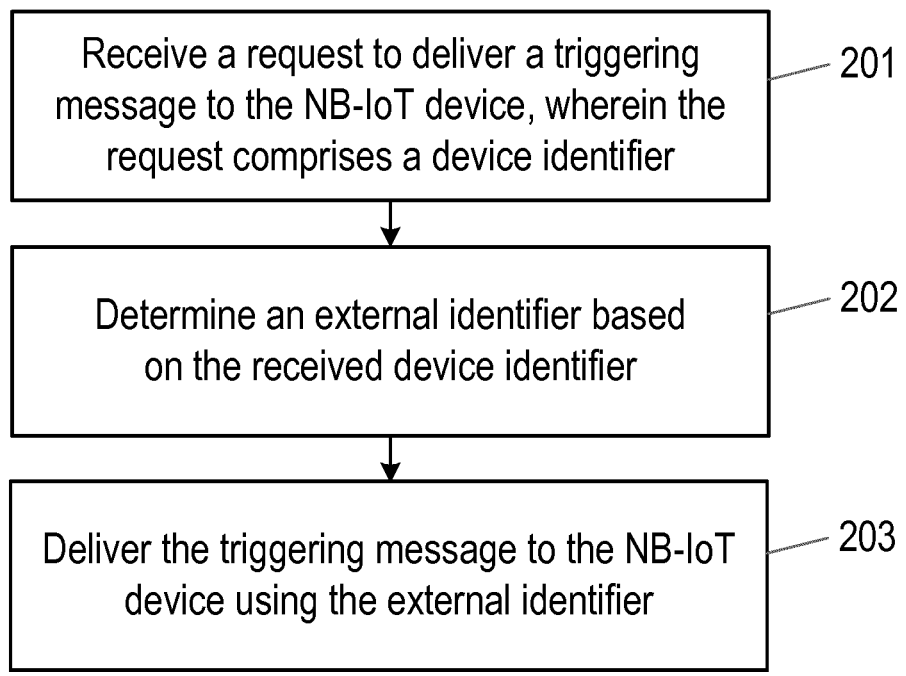
FIG. 2 illustrates a method, in a proxy server, for enabling remote management of a profile for an identity module in an NB-IoT device.

FIG. 2 illustrates a method, in a proxy server, for enabling remote management of a profile for an identity module in an NB-IoT device. For example, the method of FIG. 2 may be performed by the proxy server 108 illustrated in FIG. 1. The proxy server is configured to access a database of one or more external identifiers associated with one or more respective NB-IoT devices. For example, the proxy server 108 may be able to access a database comprising information relating to external identifiers for each of the NB-IoT devices 101a to 101c. The one or more external identifiers are used to address the respective one or more NB-IoT devices via an exposure function in a core network. As described above the exposure function may comprise a SCEF or a NEF. The management of a profile may comprise, for example, provisioning a new profile to the identity module, enabling or disabling a profile or deletion of a profile.

An external identifier may comprise a subscription identifier. For example, an external identifier may comprise a Mobile Station International Subscriber Directory Number, MSISDN.

In step 201, proxy server receives a request to deliver a triggering message to the NB-IoT device, wherein the request comprises a device identifier. The triggering message may comprise a profile download triggering message. The profile download triggering message may be intended to trigger the NB-IoT device to download a profile from a profile management server. The triggering message may comprise a profile management triggering message. The profile management triggering message may be configured to trigger the identity module in the NB-IoT device to perform a profile management operation. For example, the profile management operation may be to update, enable, disable or delete an existing profile in the identity module.

In step 202, the proxy server determines an external identifier based on the received device identifier.

In step 203, the proxy server delivers the triggering message to the NB-IoT device using the external identifier.

Figure 3:
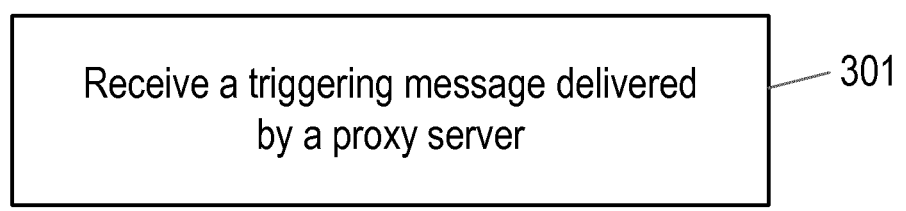
FIG. 3 illustrates a method, in a Narrow Band Internet of Things, NB-IoT, device for enabling remote management of a profile in an identity module in the NB-IoT device.

FIG. 3 illustrates a method, in a Narrow Band Internet of Things, NB-IoT, device for enabling remote management of a profile in an identity module in the NB-IoT device. Management of the profile may comprise remote provisioning of a new profile or management of an existing profile in an identity module in the NB-IoT device.

In step 301, the NB-IoT device receives a triggering message delivered by a proxy server. For example, the NB-IoT device may receive a triggering message as delivered by a proxy server according to FIG. 2.

Figure 4A:
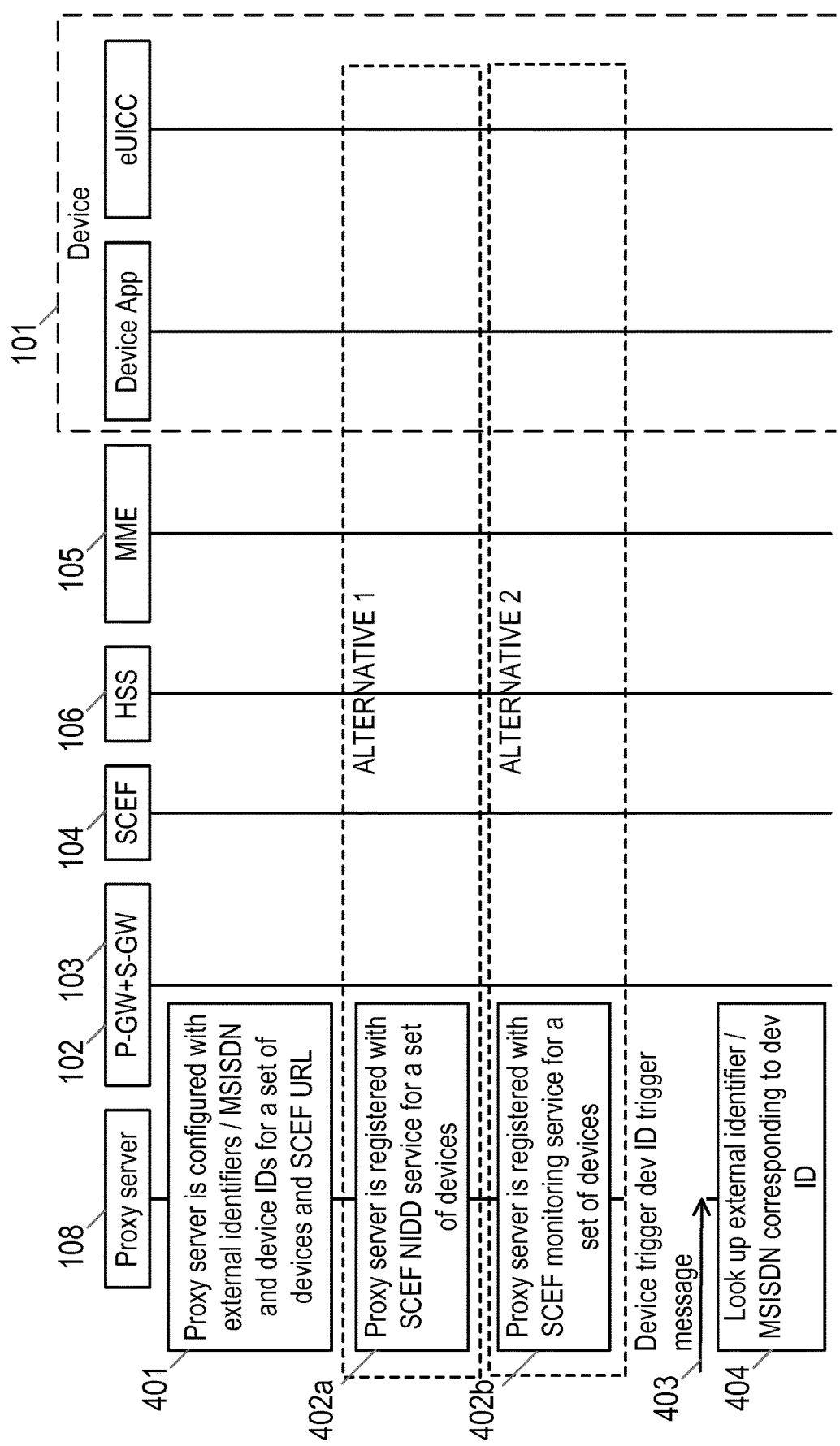
FIGS. 4a to 4b are a signalling diagram illustrating examples of the methods of FIGS. 1 and 2 in more detail.
Figure 4B:
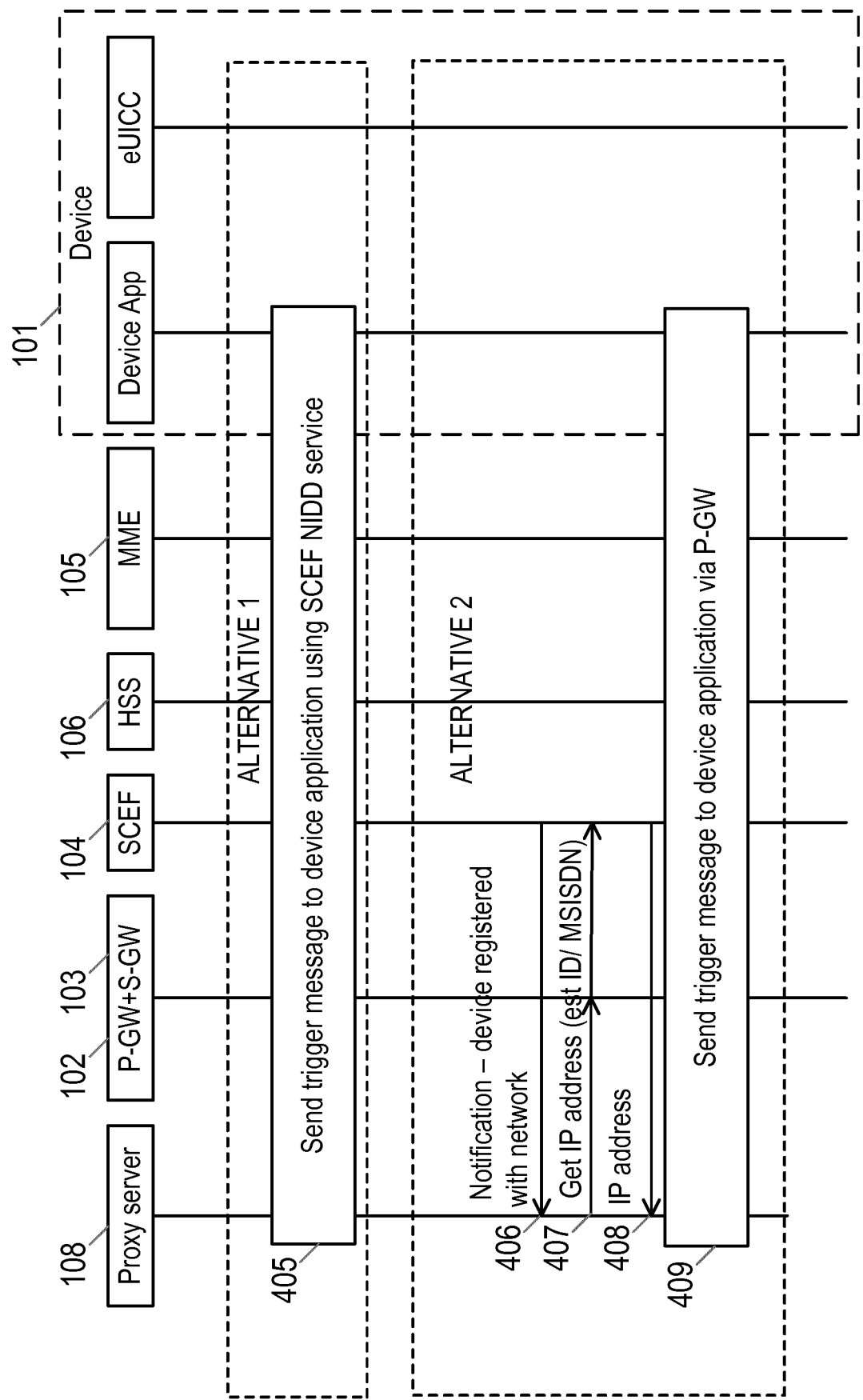

FIG. 4 is a signalling diagram illustrating examples of the methods of FIGS. 1 and 2 in more detail. In particular, FIG. 4 illustrates examples of how a triggering message may be delivered from a proxy server (e.g. proxy server 108 in FIG. 1).

As illustrated in 401, the proxy server 108 is configured to access a database of one or more external identifiers associated with one or more respective NB-IoT devices. The proxy server may also be configured with a Uniform Resource Locator for the exposure function 104.

In one example, illustrated in step 402a, the proxy server 108 is registered with the exposure function 104 for the NIDD service to communicate with a set of NB-IoT devices. In this example, after the proxy server 108 receives a request to deliver a triggering message to the NB-IoT device in step 403 (which corresponds to step 201 in FIG. 2), and the proxy server determines an external identifier based on the received device identifier in step 404 (which corresponds to step 202 in FIG. 2) the method passes to step 405.

Step 405 illustrates an example of how step 203 of FIG. 2 may be performed. In step 405 the NIDD service provided by the exposure function 104 is used to deliver the trigger message. The proxy server 108 may be registered with the exposure function 104 and may transmit the trigger message to an NB-IoT device 101 using the NIDD service send data command. The exposure function 104 may buffer the trigger message and may transmit the trigger message to the NB-IoT device 101 when the NB-IoT device 101 is powered on and registered with the network. Using the exposure function's 104 NIDD service may be natural for the first type of NB-IoT devices where exposure function's NIDD service is used for data transfer between devices and application servers. However, it will be appreciated that this embodiment may also be used in type two and type three devices in which the exposure function's NIDD service may not otherwise be used for data transfer between the NB-IoT devices and application servers.

In another example, following step 401 the method passes to step 402b. In step 402b the proxy server 108 is registered with the exposure function 104 for a monitoring service for a set of NB-IoT devices. The monitoring service may indicate to the proxy server 108 when one of the set of NB-IoT devices registers with the network. In this example, following step 404 the method passes to step 406. In particular, steps 406 to 409 in this example illustrate how step 203 in FIG. 2 may be performed. In step 406, the proxy server 108 receives a notification from the exposure function 104 indicating that one of the set of NB-IoT devices has registered with the network. It will be appreciated that step 406 may occur before steps 403 and 404.

In step 407 the proxy server, either using the exposure function 104, the P-GW 102 or a third node in the network, retrieves the current IP address (and possibly port) of the NB-IoT device based on the external identifier or MSISDN. The proxy server 108 therefore uses this service to retrieve the current IP address in combination with the exposure function 104 monitoring service. In other words, step 407 may comprise transmitting an address request to a third network node, wherein the address request comprises the external identifier.

In step 408, the proxy server 108 may receive the current IP address of the NB-IoT device 101 and transmits the triggering message to the NB-IoT device in step 409 using the received IP address. In other words, responsive to transmitting the address request, the proxy server 108 receives an IP address of the NB-IoT device.

In particular, step 409 comprises transmitting the triggering message utilising the IP address. For example, the proxy server may utilise NIDD via the P-GW 102 to transmit the triggering message (for example for type two devices). In some examples, step 409 comprises transmitting the triggering message over UDP/IP or TCP/IP to the NB-IoT device using the IP address of the device (for example for type three devices). The triggering message may therefore be routed via the P-GW 102 and S-GW 103 to the NB-IoT device 101.

The triggering message delivery service (as illustrated above in FIG. 4) of the proxy server 108 may be implemented in different ways. One option is that the proxy server 108 acts as a Constrained Application Protocol (CoAP) or Hypertext Transfer Protocol (HTTP) server and offers the trigger message delivery service as a resource which application servers use by transmitting triggering messages to the proxy server 108 to be sent to NB-IoT devices. In each CoAP/HTTP request, to this service in the proxy service, the triggering message and a device identifier may be included. The proxy server 108 may then utilise a database look-up to translate the received device identifier to an external identifier, if the external identifier is not already used as device identifier. The trigger message delivery service of the proxy server 108 may be limited to application servers that are pre-registered with the proxy server 108 or that have obtained an access token from an online authorization server (e.g. an OAuth2 server or ACE authorization server) to use the triggering message delivery service.

Figure 5A:
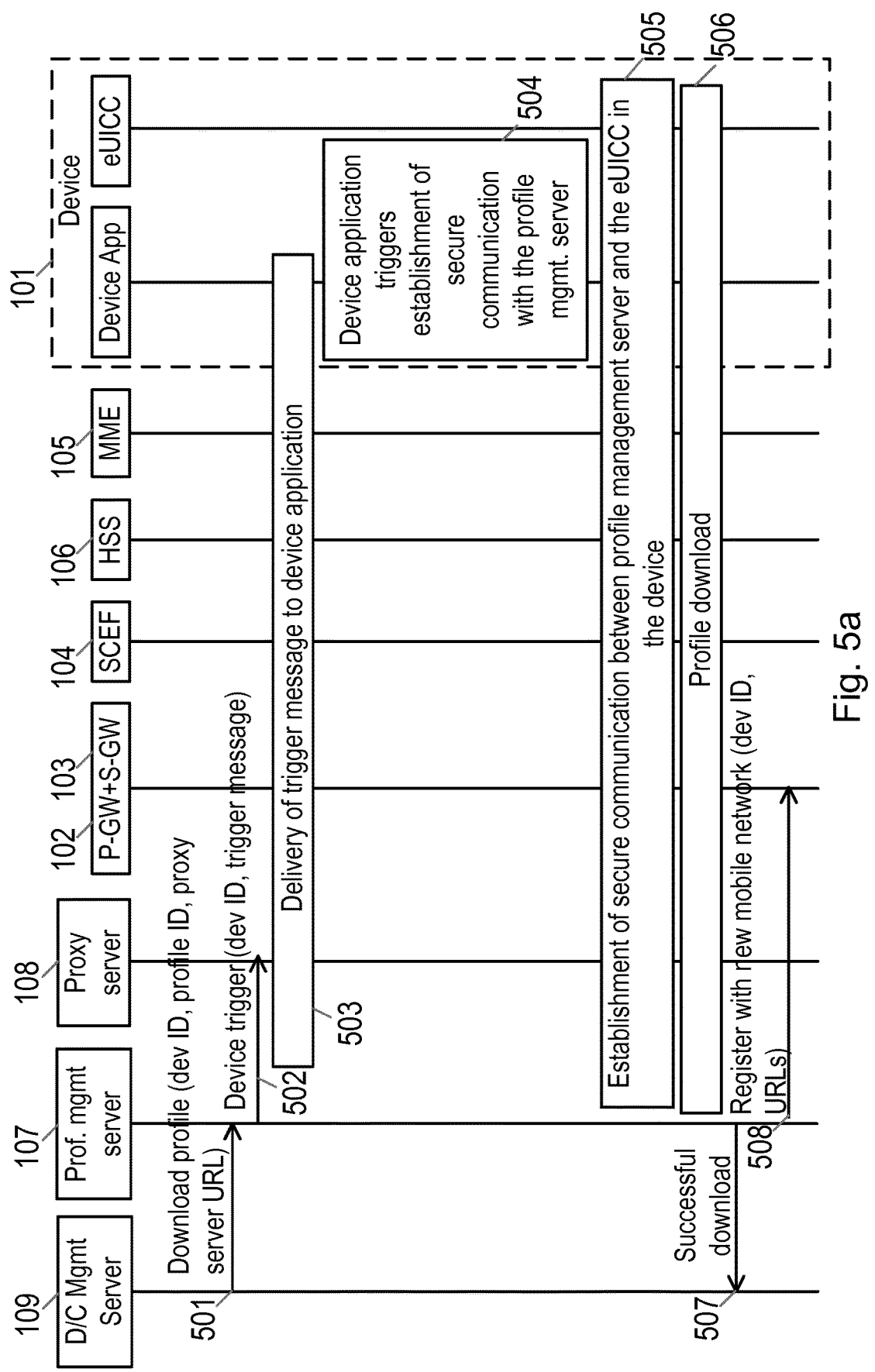
FIGS. 5a to 5b illustrate an example of a profile provisioning process according to some embodiments.
Figure 5B:
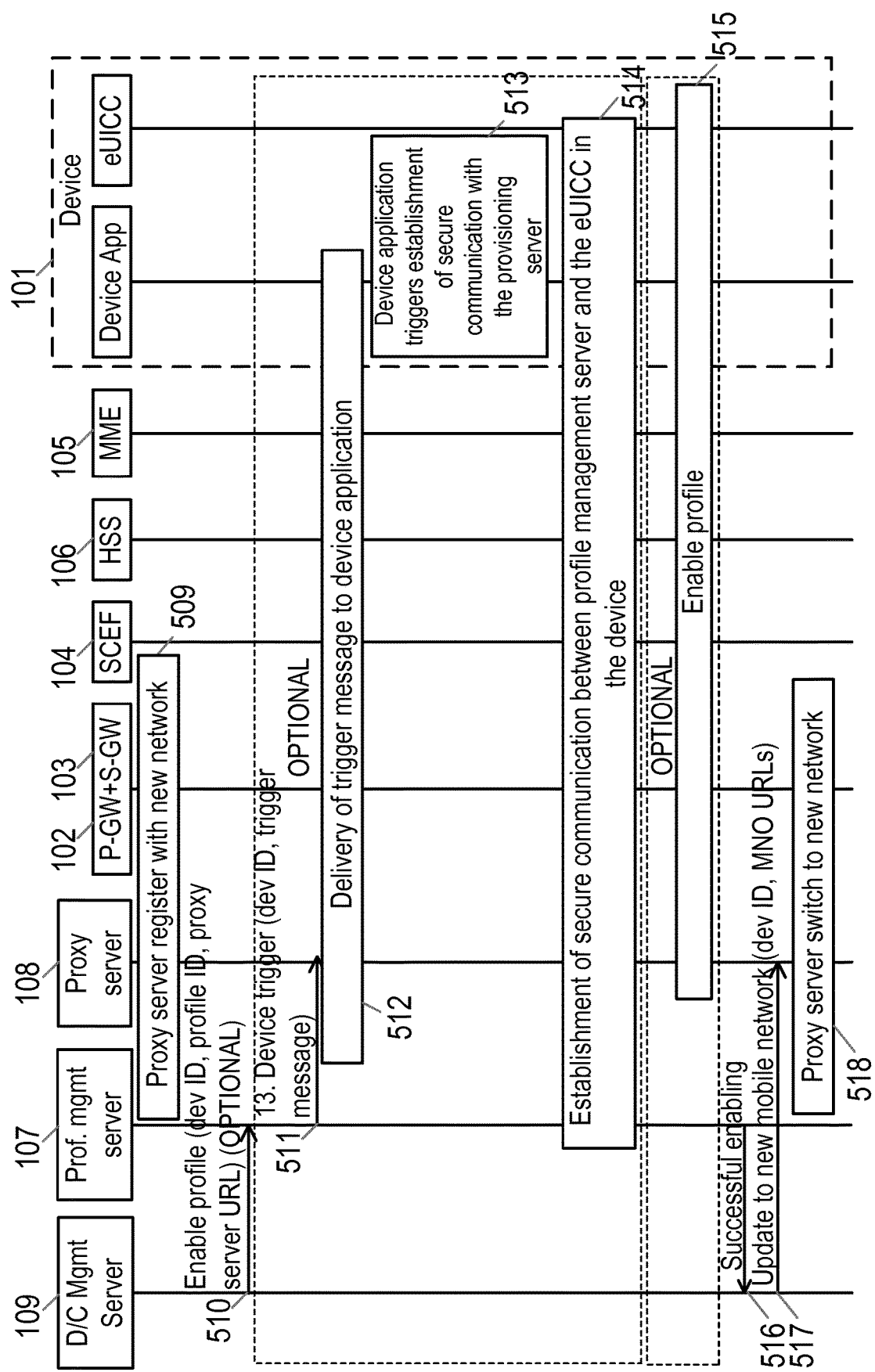

FIG. 5 illustrates an example of a profile provisioning process according to some embodiments.

The identity module of the NB-IoT device 101 (for example the eUICC) may be configured with an active cellular subscription (i.e. an enabled profile) allowing the NB-IoT device 101 to connect to a cellular network. This may be a profile installed at manufacturing with the purpose of enabling the provision of an operational profile, or it may be an operation profile previously downloaded by the NB-IoT device 101.

The HSS 106 may be configured with subscriber credentials for the NB-IoT device 101. The subscriber credentials may comprise an external identifier used to address the device via the exposure function 104 (e.g. SCEF). The proxy server 108 may be configured with the external identifier to be able to address the NB-IoT device 101. The profile management server 107 may comprise a set of profile packages which may be available for download. Corresponding profile identifiers to the profile packages may have been provided to the enterprise owning the NB-IoT device and may be provided to the D/C Management Server 109. For a given profile package, the HSS 106 of the mobile network corresponding to the profile is configured with subscriber credentials corresponding to those in the profile package, and with the external identifier of the NB-IoT 101.

For simplicity we here assume that the same external identifier or MSISDN is used in both mobile networks. Otherwise there needs to be a translation performed between the two (e.g. new external identifier is configured to proxy server where translation occurs).

In step 501, the D/C Management Server 109 transmits a command to the profile management server 107 to trigger download of a profile. In step 501, the D/C Management Server 109 may at least provide a device identifier for the NB-IoT device 101 to which the profile is to be downloaded, a profile identifier corresponding to the profile to be downloaded, and a URL of the proxy server 108. The device identifier is used to by the profile management server to identify the device for which the profile download shall be triggered, and the profile identifier identifies the profile to be downloaded. Examples of device identifiers are IMEI, external identifier, MSISDN, modem module identifier, and eUICC ID (EID).

In step 502, the profile management server 107 transmits a request to the proxy server 108 to deliver the triggering message to the NB-IoT device 101, wherein the request comprises a device identifier (Step 502 may correspond to step 201 in FIG. 2). This triggering message may comprise the URL of the profile management server 107. The profile management server 107 may also indicate the device identifier of the NB-IoT device 101 to which the triggering message applies. In some examples, the NB-IoT device 101 may be is pre-configured with the URL of the profile management server 107 and may be configured to perform step 504 upon first start-up of the NB-IoT device 101.

In step 503, the proxy server 108 delivers the triggering message to the NB-IoT device identified by the device identifier received in step 502. In particular, the proxy server may determine an external identifier based on the received device identifier in step 502. If the device identifier is different from the external identifier the proxy server uses the provided device identifier to look-up the external identifier in a database. Step 503 may then be implemented as illustrated in FIG. 4. In some examples, step 503 is optional and is not performed if the NB-IoT device 101 is pre-configured with the URL of the profile management server 107 and configured to perform step 504 upon first start-up of the device.

In step 504, the NB-IoT device 101 may establish secure communication between the identity module of the NB-IoT device 101 and the profile management server 107.

In step 505, the NB-IoT device 101 and the profile management server 107 exchange messages to establish secure communication, for example, including mutual authentication.

In step 506, the NB-IoT device 101 downloads the profile package from the profile management server 107. The profile management server 107 is aware of which profile package to download to the NB-IoT device 101 based on the device identifier and the profile identifier received in step 501. The profile package may then be installed by the NB-IoT into the identity module. For example, step 506 may comprise receiving a profile from the profile management server; and installing the profile into the identity module.

In step 507, the profile management server 107 may optionally provide a response to D/C Management Server 109 reporting on the result of the triggering message. For example, the profile management server 107 may indicate to the D/C management server 109 whether the profile has been downloaded to the NB-IoT 101 successfully or not.

In some examples, the profile may be a profile of a new mobile network. In these examples, the D/C management server 109 may transmit a request in step 508 to the proxy server 108 to switch to the new mobile network for the NB-IoT device 101. For example, the request to switch to the new mobile network may comprise a request for the proxy server to register with an exposure function, a P-GW etc belonging to the new mobile network. Note that in case of P-GW the proxy server may be pre-configured for use with NIDD from profile ordering/preparation phase and this step may then be skipped.

If step 508 is performed, the proxy server may register with the new mobile network in step 509. For example, the proxy server 108 may register with the new mobile network such that any data sent from the NB-IoT device 101 may be routed to application servers through the new mobile network. When this is done the proxy server 108 may be able to receive data from the NB-IoT device through both mobile networks, while still configured to send data to the NB-IoT device through the old mobile network, until it is established that the new profile is enabled and the switch is completed, i.e. the proxy server is configured to send data to the NB-IoT device through the new mobile network.

In some examples, the profile may be enabled separately from the download of the profile to the NB-IoT. In these examples, in step 506 the profile may be downloaded, and in step 510 the D/C Management Server 109 may transmit a request to the to the profile management server 107 to trigger enabling of the profile. The request to trigger enabling of the profile may comprise the device identifier, the profile identifier, and the URL of the proxy server 108. This step is optional, and enabling the profile may be part of step 501 when the D/C Management Server triggers the profile management server for profile download.

Responsive to receiving the request to trigger enabling of the profile in step 510, the profile management server 107 may transmit a message to the proxy server 108 in step 511 containing information to trigger enabling of the downloaded profile. This message may contain the URL of the profile management server 107. The profile management server 107 may also indicate the device identifier of the NB-IoT device 101 to which the message applies. This step may be optional if the profile enabling is done immediately after profile download while the NB-IoT device 101 is still active and in which case step 515 may be performed immediately.

In step 512 the proxy server 108 delivers the message to trigger enabling of the downloaded profile to the NB-IoT device 101 identified by the device identifier received in step 511. As described above, in this step the trigger message may be delivered to the NB-IoT device as described in FIG. 4. Step 512 is optional and may not performed if step 511 is not performed. It may also be the case that profile enabling request message of step 515 described below is contained as part of the request to trigger enabling of the profile, and is secured end-to-end from profile management server 107 to the NB-IoT device 101 using an already established security association, in which case further establishment of a secure communication (e.g. step 514) between the profile management server may not be required.

In step 514, the NB-IoT device 101 may establish secure communication between the identity module of the NB-IoT device 101 and the profile management server 107. This step is optional and may not performed if there is no request to trigger enabling of the profile from the proxy server 108 (e.g. no step 512). Step 514 may also not be performed if the profile enabling request message of step 515 is contained as part of the request to trigger enabling of the profile and is secured end-to-end from profile management server. The NB-IoT device and the profile management server 107 may then exchange messages to establish secure communication including mutual authentication.

In step 515, the profile management server 107 sends a request message to the device to enable the profile. Note that, as described above, for small messages such as this, and where a request to trigger the enabling of the profile is previously transmitted, the request message may be included as part of the request to trigger enabling of the profile, in which case steps 513-515 are not performed. The identity module in the NB-IoT device 101 may process the request message and enables the profile. A response message may be prepared that is sent in return from the NB-IotT device 101 to the profile management server 107. The response message may, if no secure communication is established in step 514, be protected using an already established security association.

In step 516, the profile management server 107 optionally provides a response to the D/C Management Server 109 reporting on the result of the operation. For example, the profile management server 107 may report whether the profile has been enabled or not.

In response to successful enabling of the profile occurring, and the profile is at a new mobile network operator, the D/C Management Server 109 may instruct in step 517 the proxy server 108 to switch to using services from the new mobile network operator. For example, the proxy server 108 may be instructed to switch to using the exposure function (e.g. SCEF) and/or P-GW at the new mobile network for the particular NB-IoT device for which the profile was changed. The registration with the new mobile network may have occurred earlier (for example at step 509). The device identifier of the NB-IoT device may be provided along with the URLs to the different MNO services that are used (SCEF, P-GW, etc.).

In step 518 the proxy server 108 may change its settings such that data from application servers to the NB-IoT device 101 is now forwarded via the new mobile network. The proxy server 108 may also deregister from the old mobile network services.

The latter part of the flow, for example steps 508-518, may apply to any standalone profile management operation such as enable profile, disable profile, and delete profile. Steps 508, 509, 517, and 518 may only be relevant when a profile is enabled that also means a switch from one MNO to another MNO.

Constrained Application Protocol (CoAP) is a protocol for use in constrained IoT devices for transfer of application related messages. In some embodiments, CoAP is used between the NB-IoT device 101 and the profile management server 107 for transfer of profile download and profile management related messages.

In some embodiments, the profile management (including management and provisioning of a new profile) are according to the GSMA RSP M2M variant. In this example the profile management server 107 may be represented by two servers referred to as SM-SR and SM-DP. The SM-SR and SM-DP may be operated by the MNO from which the enterprise has ordered the new subscription profile or the SM-SR and SM-DP may be operated by a $3^{rd}$ party and may be part of a service provided to the MNO. The SM-SR and SM-DP may be co-located and administrated by one and the same entity, or they may be separate and run by different parties. In case SM-SR and SM-DP are services from a $3^{rd}$ party that the MNO uses included as part of the profile management server is also an MNO portal providing an interface towards customers for profile management operations linking the D/C Management Server 109 with SM-DP and SM-SR.

Secure communication over the air with the identity module in the NB-IoT 101 related to remote profile download and profile management may be exclusively handled by the SM-SR. Secure communication may be based on credentials shared between the SM-SR and the identity module. The SM-DP may be the entity that handles the profile download through the secure communication tunnel established between the SM-SR and identity module. The SM-SR may also be the entity that controls profile management operations (enable, disable, and delete profile). It may be assumed that, the individual communication between SM-SR, SM-DP, and MNO portal may follow the GSMA RSP standard and therefore no details of this communication have been included herein. It will however be appreciated that this communication between the SM-SR, SM-DP, and MNO portal may comprise any suitable communication methods. The same is true for communication between the identity module and MNO portal/SM-DP/SM-SR that is performed inside the secure communication tunnel.

The secure communication between the SM-SR 107 may be based on (protected) SMS, HTTPS, and Card Application Toolkit Transport Protocol (CAT_TP). SMS may be used to trigger HTTPS and CAT_TP sessions and for simple commands that fit into one or a few SMS. HTTPS or CAT_TP may be used for data intense transfers e.g. transfers related to profile download.

Figure 6A:
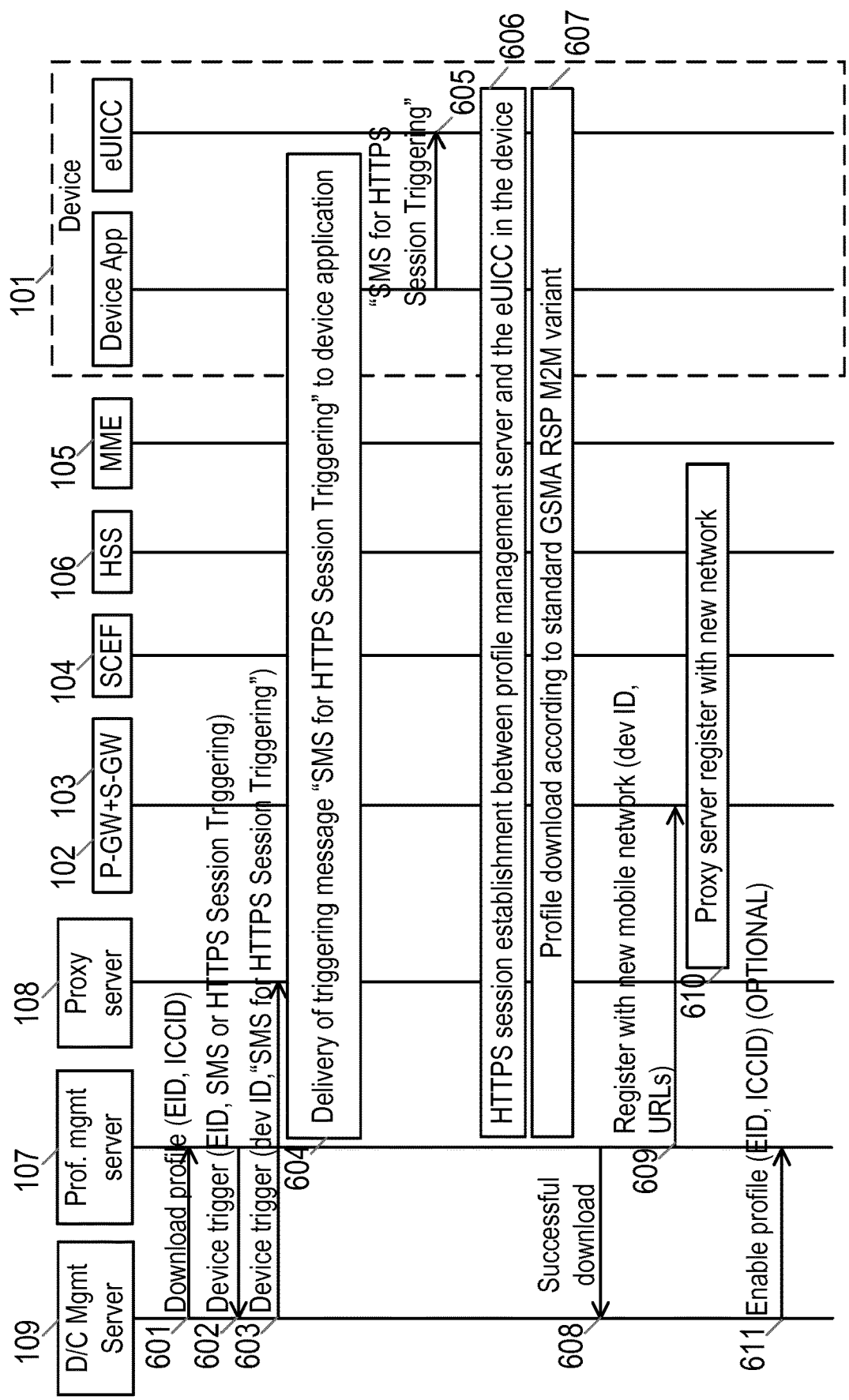
FIGS. 6a to 6b illustrate an example of the signalling diagram illustrated in FIG. 5.
Figure 6B:
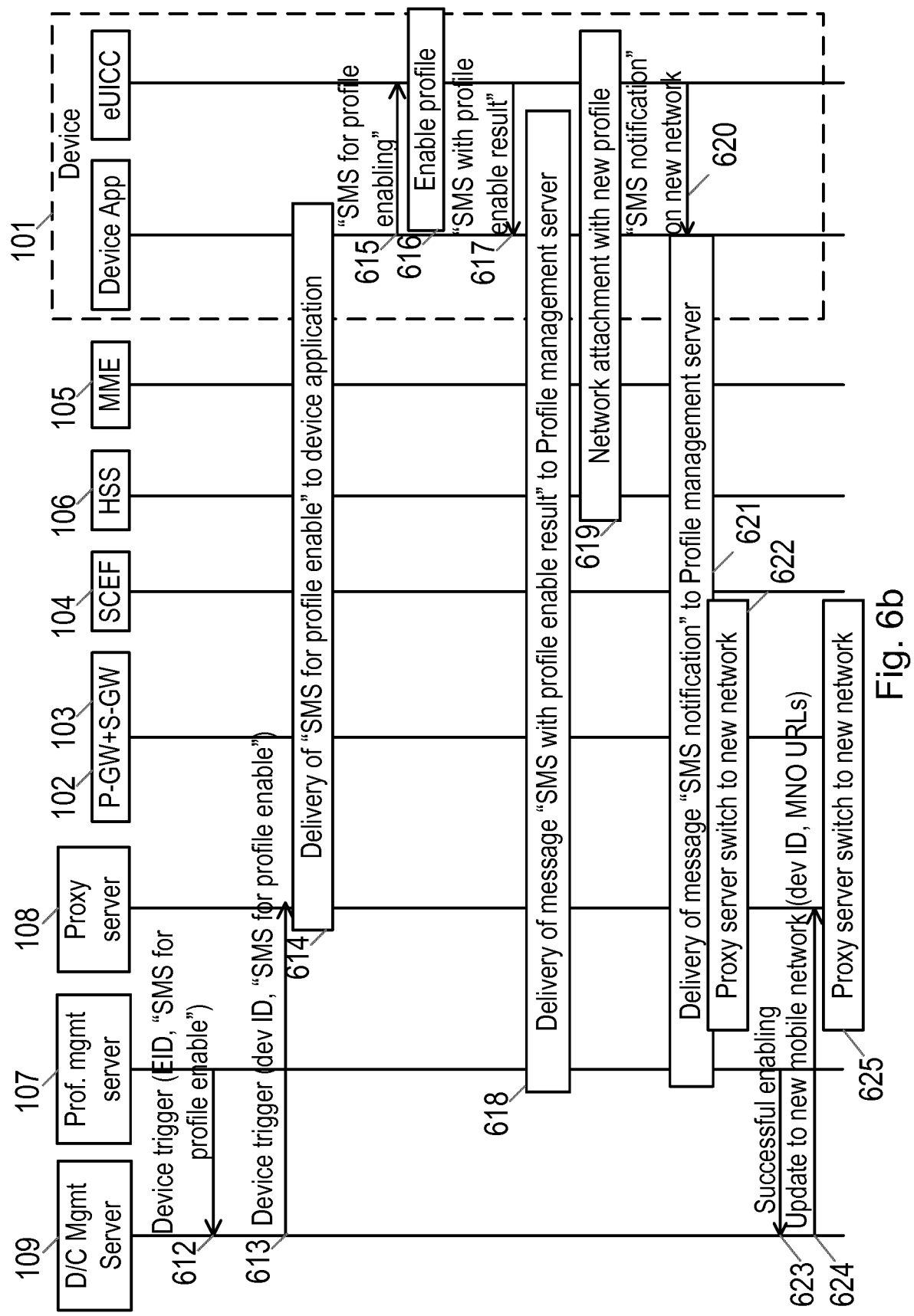

FIG. 6 illustrates an example of the signalling diagram illustrated in FIG. 5. This example may relate to the use of GSMA RSP M2M variant. In order to minimize the number of changes to standard GSMA RSP components (e.g. SM-SR) and to the identity module supporting the M2M variant, and to minimize the knowledge of proxy server 108, device IDs etc at the profile management server 107, the communication flow is modified such that triggering message and the request to trigger enabling of the profile are routed via the D/C Management Server 109.

As indicated above, as the NB-IoT device 101 does not support SMS, the triggering message may be transmitted as described with reference to FIG. 4. In this example, triggering message may be of the same format as a SMS format used in GSMA RSP. For example, the SMS format may comprise the expanded remote APDU command structure defined by ETSI. Hence, from the identity module point of view, it will receive an identical message from the NB-IoT device as when used in a device supporting the SMS service. Similarly for the SM-SR and SM-DP, they may produce an SMS-formatted triggering message according to the standard, but they do not send SMS messages using the SMS service. Instead the SMS triggering message is provided to the D/C management server 109 for delivery to the NB-IoT device 101.

The identity module of the NB-IoT device 101 (for example the eUICC) may be configured with an active cellular subscription (i.e. an enabled profile) allowing the NB-IoT device 101 to connect to a cellular network. This may be a profile installed at manufacturing with the purpose of enabling the provision of an operational profile, or it may be an operation profile previously downloaded by the NB-IoT device 101.

The HSS 106 may be configured with subscriber credentials for the NB-IoT device 101. The subscriber credentials may comprise an external identifier used to address the device via the exposure function 104 (e.g. SCEF). The proxy server 108 may be configured with the external identifier to be able to address the NB-IoT device 101. The profile management server 107 may comprise a set of profile packages which may be available for download. Corresponding profile identifiers to the profile packages may have been provided to the enterprise owning the NB-IoT device and may be provided to the D/C Management Server 109. For a given profile package, the HSS 106 of the mobile network corresponding to the profile is configured with subscriber credentials corresponding to those in the profile package, and with the external identifier of the NB-IoT 101.

In step 601, the D/C Management Server 109 transmits a command to the profile management server 107 to trigger download of a profile. In step 501, the D/C Management Server 109 may at least provide a device identifier for the NB-IoT device 101 to which the profile is to be downloaded, a profile identifier corresponding to the profile to be downloaded, and a URL of the proxy server 108. The device identifier is used to by the profile management server 107 to identify the device for which the profile download shall be triggered, and the profile identifier identifies the profile to be downloaded. In this example, the device identifier comprises an eUICC ID (EID). In this example, the profile identifier comprises an ICCID.

In step 602, the profile management server 107 transmits a message to the D/C management server 109 comprising data formatted according to the GSMA RSP M2M variant "SMS for HTTPS session triggering" (e.g. the triggering message formatted according to the GSMA RSP M2M variant). In particular, the message may comprise the EID and the information for the triggering message.

In this example, therefore, in step 603 the D/C management server 209 transmits the request to the proxy server 108 to deliver the triggering message to the NB-IoT device 101, wherein the request comprises a device identifier (Step 603 may correspond to step 201 in FIG. 2). In this example, the D/C management server may look-up the device identifier corresponding to the EID.

In step 604, the proxy server 108 delivers the triggering message to the NB-IoT device identified by the device identifier received in step 603. In particular, the proxy server 108 may determine an external identifier based on the received device identifier in step 603. If the device identifier is different from the external identifier the proxy server 108 uses the provided device identifier to look-up the external identifier in a database. Step 604 may then be implemented as illustrated in FIG. 4.

In step 605, the device application in the NB-IoT device 101 may transmit the "SMS for HTTPS session trigger" to the identity module in the NB-IoT 101.

In step 606, the NB-IoT device 101 and the profile management server 107 exchange messages to establish secure communication, for example, including mutual authentication. In this example, step 606 comprises establishment of an HTTPS session according to GSMA RSP M2M variant. The solution here ensures the two endpoints, the profile management server (SM-SR part) 107 and the identity module in the NB-IoT 101, do not require modifications and may exchange HTTPS messages that are transferred between them. The details of how messages are transferred are described below.

In step 607, the NB-IoT device 101 downloads the profile package from the profile management server 107. The profile management server 107 is aware of which profile package to download to the NB-IoT device 101 based on the device identifier and the profile identifier received in step 601. The profile package may then be installed by the NB-IoT into the identity module. For example, step 607 may comprise receiving a profile from the profile management server; and installing the profile into the identity module. In this example, the profile package is downloaded to the NB-IoT device and installed into the identity module following the standard GSMA RSP M2M protocol consisting of a sequence of messages all exchanged within the secure tunnel between profile management server (SM-SR part) 107 and the identity module.

In step 608, the profile management server 107 may optionally provide a response to D/C Management Server 109 reporting on the result of the triggering message. For example, the profile management server 107 may indicate to the D/C management server 109 whether the profile has been downloaded to the NB-IoT 101 successfully or not.

In this example, the profile is a profile of a new mobile network. In this example therefore, the D/C management server 109 may transmit a request in step 609 to the proxy server 108 to switch to the new mobile network for the NB-IoT device 101. For example, the request to switch to the new mobile network may comprise a request for the proxy server to register with an exposure function, a P-GW etc belonging to the new mobile network. The URLs of the MNO services that the proxy server is being requested to register with may be included in the request. Note that in case of P-GW the proxy server may be pre-configured for use with NIDD from profile ordering/preparation phase and this step may then be skipped.

In response to step 609, the proxy server may register with the new mobile network in step 610. For example, the proxy server 108 may register with the new mobile network such that any data sent from the NB-IoT device 101 may be routed to application servers through the new mobile network. When this is done the proxy server 108 may be able to receive data from the NB-IoT device through both mobile networks, while still configured to send data to the NB-IoT device through the old mobile network, until it is established that the new profile is enabled and the switch is completed, i.e. the proxy server is configured to send data to the NB-IoT device through the new mobile network.

In this example, the profile may be enabled separately from the download of the profile to the NB-IoT. In this example therefore, in step 607 the profile may be downloaded, and in the step 611 the D/C Management Server 109 may transmit a request to the to the profile management server 107 to trigger enabling of the profile. In this example, the request transmitted in step 611 comprises the EID and the ICCID. This step is optional and enabling the profile may be part of step 601 when the D/C Management Server triggers the profile management server for profile download.

In step 612, the profile management server 107 sends a message to the D/C Management Server containing the EID and data formatted according to GSMA RSP M2M variant "SMS for profile enable". In addition, the URL of the profile management server may be contained in the message. Note that if step 611 is not performed the trigger for providing the "SMS for profile enable" is that the profile was successfully downloaded. The message may then be provided by the profile management server 107 to the D/C Management Server 109 as part of step 608.

Responsive to receiving the message in step 612, the D/C management server 109 may transmit a message to the proxy server 108 in step 613 containing information to trigger enabling of the downloaded profile. In particular, the D/C Management Server may look up the device identifier corresponding to EID provided in step 612 and may transmit the message ("SMS for profile enabling") and device identifier to the proxy server 108 for delivery of the message to the NB-IoT device 101. This message may contain the URL of the profile management server 107.

In step 614 the proxy server 108 delivers the message to trigger enabling of the downloaded profile to the NB-IoT device 101 identified by the device identifier received in step 613. As described above, in this step the trigger message may be delivered to the NB-IoT device as described in FIG. 4.

In step 615, the device application in the NB-IoT device 101 delivers the message ("SMS for profile enabling") to the identity module.

In step 616, the identity module enables the profile and prepares a message with the result of the profile enable operation formatted as an "SMS".

In step 617, the message prepared in step 616 is delivered to the device application in the NB-IoT device 101.

In step 618, the message of steps 616 and 617 is delivered from the device application in the NB-IoT device 101 to the profile management server 107. The URL of the profile management server 107 may either known to the device application/identity module, be part of the message "SMS for profile enabling" received in step 614, or delivered together with the "SMS for profile enabling" in step 614.

In step 619, upon successful enabling of the profile, an attachment to the new network is be performed (as in this example the new profile is with a new mobile network).

In step 620, the identity module prepares a notification message formatted as an "SMS" that is delivered to the device application.

In step 621, the message ("SMS notification") is delivered from the device application to the profile management server 107. The URL of the profile management server may be known to the NB-IoT device 101 from before.

In the delivery of the message in step 621, the proxy server 108 receives traffic from the NB-IoT device 101 via the new mobile network that it has registered for in step 610. The proxy server 108 may then decide to switch the mobile network for the NB-IoT device 101 and may send data to the NB-IoT device 101 via the new mobile network in step 622.

In step 623, the profile management server 107 optionally provides a response to the D/C Management Server 109 reporting on the result of the operation. For example, the profile management server 107 may report whether the profile has been enabled or not.

In response to successful enabling of the profile occurring, and as profile is at a new mobile network operator, the D/C Management Server 109 may instruct in step 624 the proxy server 108 to switch to using services from the new mobile network operator. For example, the proxy server 108 may be instructed to switch to using the exposure function (e.g. SCEF) and/or P-GW at the new mobile network for the particular NB-IoT device for which the profile was changed. The registration with the new mobile network may have occurred earlier (for example at step 610). The device identifier of the NB-IoT device may be provided along with the URLs to the different MNO services that are used (SCEF, P-GW, etc.).

In step 625 the proxy server 108 may change its settings such that data from application servers to the NB-IoT device 101 is now forwarded via the new mobile network. The proxy server 108 may also deregister from the old mobile network services.

FIG. 6 is an example flow illustrating how communication between SM-SR part of profile management server and eUICC is performed in the case of an NB-IoT device 101 where no SMS service is provided and where NIDD may be used. FIG. 6 shows how "SMS" delivery and data delivery using HTTPS session is handled. A CAT_TP session is handled in the same way as HTTPS. With the same techniques all GSMA RSP M2M variant flows may be adapted accordingly.

In some embodiments the profile download and profile management are performed according to the GSMA RSP consumer variant. In this case the profile management server 107 is known as SM-DP+. The SM-DP+ 107 may be operated by the MNO from which the enterprise has ordered new subscription profiles or it may be operated by a $3^{rd}$ party and may be part of a service provided to the MNO. In examples where the SM-DP+ 107 is a service provided by a $3^{rd}$ party that the MNO uses, included as part of the profile management server is also an MNO portal providing an interface towards customers for profile management operations linking the D/C Management Server 109 with SM-DP+. This example is illustrated in FIG. 7

The D/C Management Server 109 may remotely control profile download and profile management operations via a Local Profile Assistant (LPAd) 700 in the NB-IoT device 101. The LPAd 70 handles interactions with the identity module and with the profile management server 107. Secure communication may be established between the LPAd 700 and both the D/C Management Server 109 and the profile management server 107. The individual communication between SM-DP+ 107 and the MNO portal may follow the GSMA RSP standard and therefore no details are provided herein for this part of the communications. The same is true for communications between the identity module and the SM-DP+ 107 that may be performed inside the secure communication tunnel between the LPAd 700 and SM-DP+ 107.

The secure communication between the SM-DP+ 107 and the LPAd 700 may be based on HTTPS and the secure communication between the LPAd 700 and the D/C Management Server 109 may be based on Transport Layer Security (TLS)/Datagram TLS (DTLS) or Object Security for Constrained RESTful Environments (OSCORE).

Figure 7A:
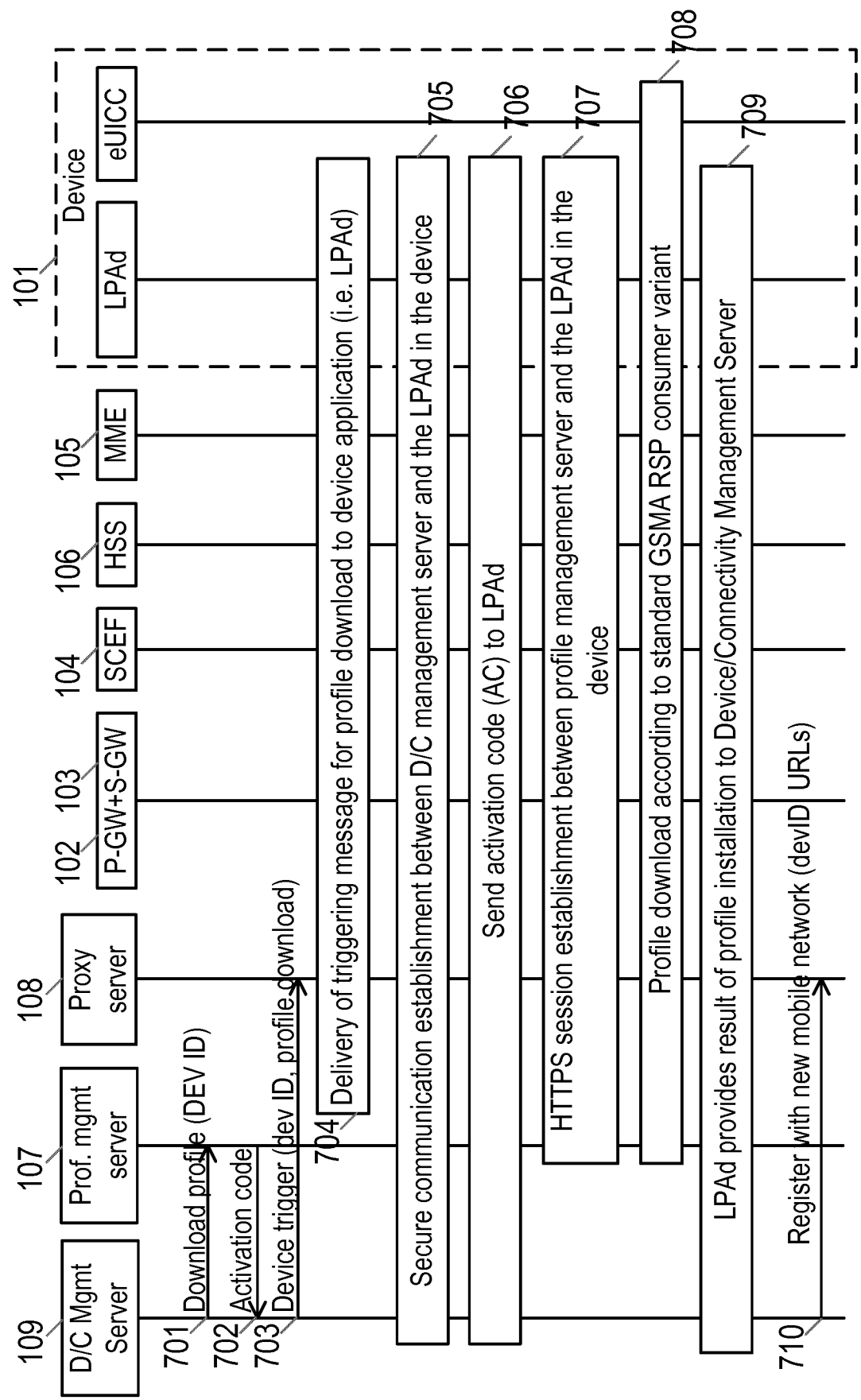
FIGS. 7a to 7b illustrate an example of the signalling diagram illustrated in FIG. 5.
Figure 7B:
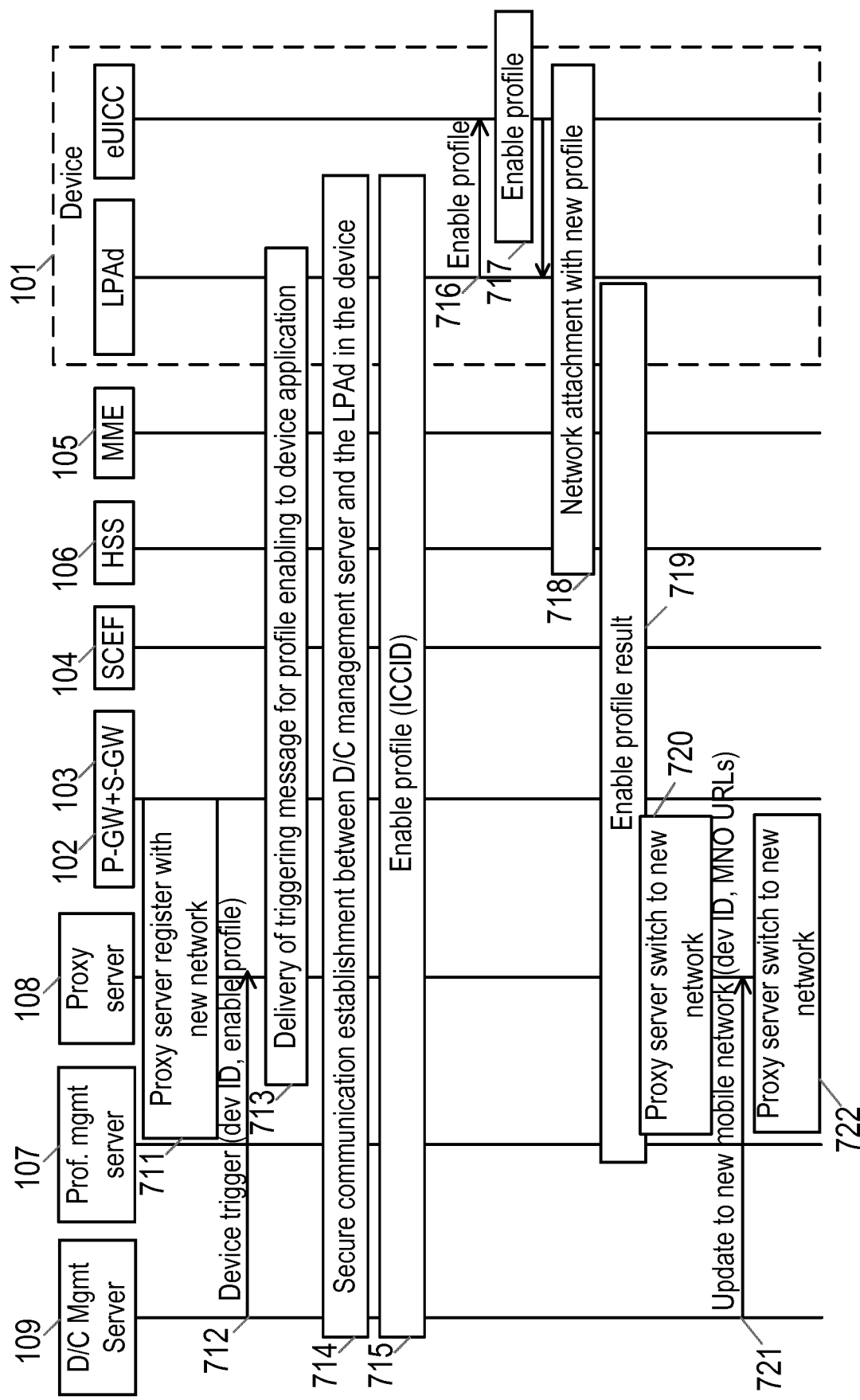

FIG. 7 illustrates an example of the flow shown in FIG. 5. In particular FIG. 7 illustrates the flow of FIG. 5 for examples in which the GSMA RSP consumer variant being used. The communication flow may be modified such that triggering messages are routed via the D/C Management Server 109 after obtaining profile download token information.

The identity module of the NB-IoT device 101 (for example the eUICC) may be configured with an active cellular subscription (i.e. an enabled profile) allowing the NB-IoT device 101 to connect to a cellular network. This may be a profile installed at manufacturing with the purpose of enabling the provision of an operational profile, or it may be an operation profile previously downloaded by the NB-IoT device 101.

The HSS 106 may be configured with subscriber credentials for the NB-IoT device 101. The subscriber credentials may comprise an external identifier used to address the device via the exposure function 104 (e.g. SCEF). The proxy server 108 may be configured with the external identifier to be able to address the NB-IoT device 101. The profile management server 107 may comprise a set of profile packages which may be available for download. The preparation of these profiles by the profile management server follows from the enterprise owning one or more NB-IoT devices, and ordering profiles for its devices via the MNO portal of the profile management server 107, and where the enterprise may have provided device identifiers for its devices. Corresponding profile download information (i.e. profile identifiers to the profile packages) may then have been provided to the enterprise owning the NB-IoT device and may be provided to the D/C Management Server 109. For a given profile package, the HSS 106 of the mobile network corresponding to the profile is configured with subscriber credentials corresponding to those in the profile package, and with the external identifier of the NB-IoT 101.

Steps 701 and 702 relate to the D/C Management Server 109 obtaining profile download information as described above. In step 701, the D/C Management Server 109 transmits a command to the profile management server 107 (MNO portal part) to obtain profile download information. In step 701, the D/C Management Server 109 may provide least provide a device identifier for the NB-IoT device 101 to which the profile is to be downloaded. The device identifier is used to by the profile management server 107 to identify the device for which the profile download shall be triggered. In this example, the device identifier comprises an eUICC ID (EID) or an International Mobile Equipment Identity (IMEI).

In step 702, the profile management server 107 transmits a message to the D/C management server 109 comprising an address of the SM-DP+ 107, and a profile download identifier. The address and the profile download identifier may be provided in the form of an activation code. Note that the activation code may be obtained by the enterprise by other means and then configured to the D/C Management Server 109. Steps 701 and 702 may then not be performed.

In step 703, the D/C management server 109 transmits the request to the proxy server 108 to deliver the triggering message to the NB-IoT device 101, wherein the request comprises the device identifier (Step 703 may correspond to step 201 in FIG. 2).

In step 704, the proxy server 108 delivers the triggering message to the NB-IoT device identified by the device identifier received in step 703. In particular, the proxy server 108 may determine an external identifier based on the received device identifier in step 703. If the device identifier is different from the external identifier the proxy server 108 uses the provided device identifier to look-up the external identifier in a database. Step 704 may then be implemented as illustrated in FIG. 4.

In step 705, the device application (e.g. the LPAd 700) in the NB-IoT device 101 triggers establishment of secure communication between the device and the D/C Management Server. Depending on the type of NB-IoT device different protocols may be used. For e.g. NB-IoT devices using IP based communication, step 705 may use TLS/DTLS, and for NB-IoT devices using CoAP step 705 may utilize OSCORE. Note that in case OSCORE is used, a shared security context may already be established, for example using EDHOC, and OSCORE may be directly used. Alternatively, Ephemeral Diffie-Hellman Over COSE (EDHOC) may be used for OSCORE security context establishment. Step 705 may only be performed if step 704 is performed.

In step 706 the D/C management server 109 securely delivers the activation code to the LPAd 700.

In step 707, the NB-IoT device 101 (for example the LPAd 700) establishes secure communication with the profile management server 107 (for example, including mutual authentication). For example, the LPAd 700 may utilise the address in the activation code to establish communication with the profile management server 107. In particular step 707 may comprise establishment of an HTTPS session according to GSMA RSP consumer variant. Embodiments herein may ensure that the two endpoints, for example, the profile management server (SM-DP+ part) 107 and LPAd 700, do not require modifications, and may exchange HTTPS messages that are transferred between them. The details of how messages are transferred are described below.

In step 708, the NB-IoT device 101 downloads the profile package from the profile management server 107. The profile package may then be installed by the NB-IoT into the identity module. For example, step 708 may comprise receiving a profile from the profile management server; and installing the profile into the identity module. In this example, the profile package is downloaded to the device and installed into the identity module following standard GSMA RSP protocol, consumer variant, consisting of a sequence of messages all exchanged within the secure tunnel between profile management server (SM-DP+) and the LPAd and where the LPAd handles the interaction with the identity module. This sequence of messages involves the LPAd providing a profile identifier (called matching identifier) and/or the EID to the profile management server such that the profile management server knows what profile package in a set of prepared profile packages to download for this particular device.

In step 709, the LPAd 700 may optionally provide a response to D/C Management Server 109 reporting on the result of the triggering message. For example, the LPAd 700 may indicate to the D/C management server 109 whether the profile has been downloaded to the NB-IoT device 101 successfully or not. This response may include the profile identifier ICCID for use in profile management operations related to the profile.

In this example, the profile is a profile of a new mobile network. In this example therefore, the D/C management server 109 may transmit a request in step 710 to the proxy server 108 to switch to the new mobile network for the NB-IoT device 101. For example, the request to switch to the new mobile network may comprise a request for the proxy server to register with an exposure function, a P-GW etc belonging to the new mobile network. The URLs of the MNO services that the proxy server is being requested to register with may be included in the request. The device identifier may also be included in the request. Note that in case of P-GW the proxy server may be pre-configured for use with NIDD from profile ordering/preparation phase and this step may then be skipped.

In response to step 710, the proxy server may register with the new mobile network in step 711. For example, the proxy server 108 may register with the new mobile network such that any data sent from the NB-IoT device 101 may be routed to application servers through the new mobile network. When this is done the proxy server 108 may be able to receive data from the NB-IoT device through both mobile networks, while still configured to send data to the NB-IoT device through the old mobile network, until it is established that the new profile is enabled and the switch is completed, i.e. the proxy server is configured to send data to the NB-IoT device through the new mobile network.

In this example, the profile may be enabled separately from the download of the profile to the NB-IoT. In this example therefore, in step 708 the profile may be downloaded, and in the step 712 the D/C Management Server 109 may transmit a request to the to the proxy server 108 to trigger enabling of the profile. The request may comprise the device identifier. Step 712 may only be performed if there is not already secure communication established between the D/C Management Server 107 and the NB-IoT device 101 and if the triggering message in step 703 did not already indicate both profile download and enabling of the downloaded profile to be performed.

In step 713 the proxy server 108 delivers the message to trigger enabling of the downloaded profile to the NB-IoT device 101 identified by the device identifier received in step 712. As described above, in this step the trigger message may be delivered to the NB-IoT device as described in FIG. 4. Step 713 is optional and may not performed if step 712 is not performed.

In step 714, the device application (e.g. the LPAd 700) triggers establishment of secure communication between the NB IoT device 101 and the D/C Management Server 107. Depending on the type of device different protocols may be used. For e.g. NB-IoT devices using IP based communication, step 714 may use TLS/DTLS, and for NB-IoT devices using CoAP step 714 may utilize OSCORE. Note that in case OSCORE is used, a shared security context may already be established, using e.g. EDHOC, and OSCORE may be directly used. Alternatively, EDHOC may be used for OSCORE security context establishment. Step 714 may only be performed if step 713 is performed.

In step 715, the D/C management server 109 transmits a message to the LPAd 700 to trigger enabling of the new profile. This message may be skipped if the triggering message in step 703 also indicated enabling of the downloaded profile to be performed. The profile identifier ICCID may also be provided as part of the message.

In step 716, the LPAd 700 triggers the enabling of the profile with the provided profile identifier at the identity module.

In step 717, the identity module enables the new profile.

In step 718, upon successful enabling of the profile, an attachment to the new network is be performed (as in this example the new profile is with a new mobile network).

In step 719, the LPAd 700 provides a response to the D/C management server indicating whether the enabling of the profile was successful.

In the delivery of the response in step 719, the proxy server 108 receives traffic from the NB-IoT device 101 via the new mobile network. The proxy server 108 may then decide, in step 720, to switch the mobile network for the NB-IoT device 101 and may from now on send data to the NB-IoT device 101 via the new mobile network.

In response to successful enabling of the profile occurring, and as profile is at a new mobile network operator, the D/C Management Server 109 may instruct in step 721 the proxy server 108 to switch to using services from the new mobile network operator. For example, the proxy server 108 may be instructed to switch to using the exposure function (e.g. SCEF) and/or P-GW at the new mobile network for the particular NB-IoT device for which the profile was changed. The registration with the new mobile network may have occurred earlier (for example at step 711). The device identifier of the NB-IoT device may be provided along with the URLs to the different MNO services that are used (SCEF, P-GW, etc.).

In step 722 the proxy server 108 may change its settings such that data from application servers to the NB-IoT device 101 is now forwarded via the new mobile network. The proxy server 108 may also deregister from the old mobile network services.

Note that it is possible to order profiles for one or more devices without providing the EID or other device identifier at the time of ordering, where the binding of the profile to a particular NB-IoT device occurs at the profile download. The D/C Management Server may, for example, before step 703 have been configured with a set of activation codes for a set of NB-IoT devices, and may select one activation code out of this set for use in step 706. It is then the D/C Management Server that decides which profile goes to which NB-IoT device. The binding between profile and device identifier and the EID may then occur in the profile download in step 708 where the SM-DP+ receives EID and IMEI from the device, and this binding may be reported to the MNO.

FIG. 7 illustrates an example flow illustrating how communication between the SM-DP+ and the NB-IoT device (for example the identity module) is performed in the case of NB-IoT devices where NIDD may be used. With the same techniques all GSMA RSP consumer variant flows may be adapted accordingly.

In some embodiments, the profile download and profile management are according to the GSMA RSP consumer variant adapted for IoT. Here the LPAd 700 is split into two parts where the main part, LPApr, is moved out from the device to the D/C Management Server 109 and a small part, LPAdv 800, remains in the NB-IoT device 101 for communication with the identity module. The HTTPS based communication is in this case handled by LPApr in the D/C Management Server which makes the NB-IoT device 101 less complex and the proxy server 108 may also be simplified. The messages between the D/C Management Server and the LPAdv may correspond to those related to the communication with the eUICC.

Figure 8A:
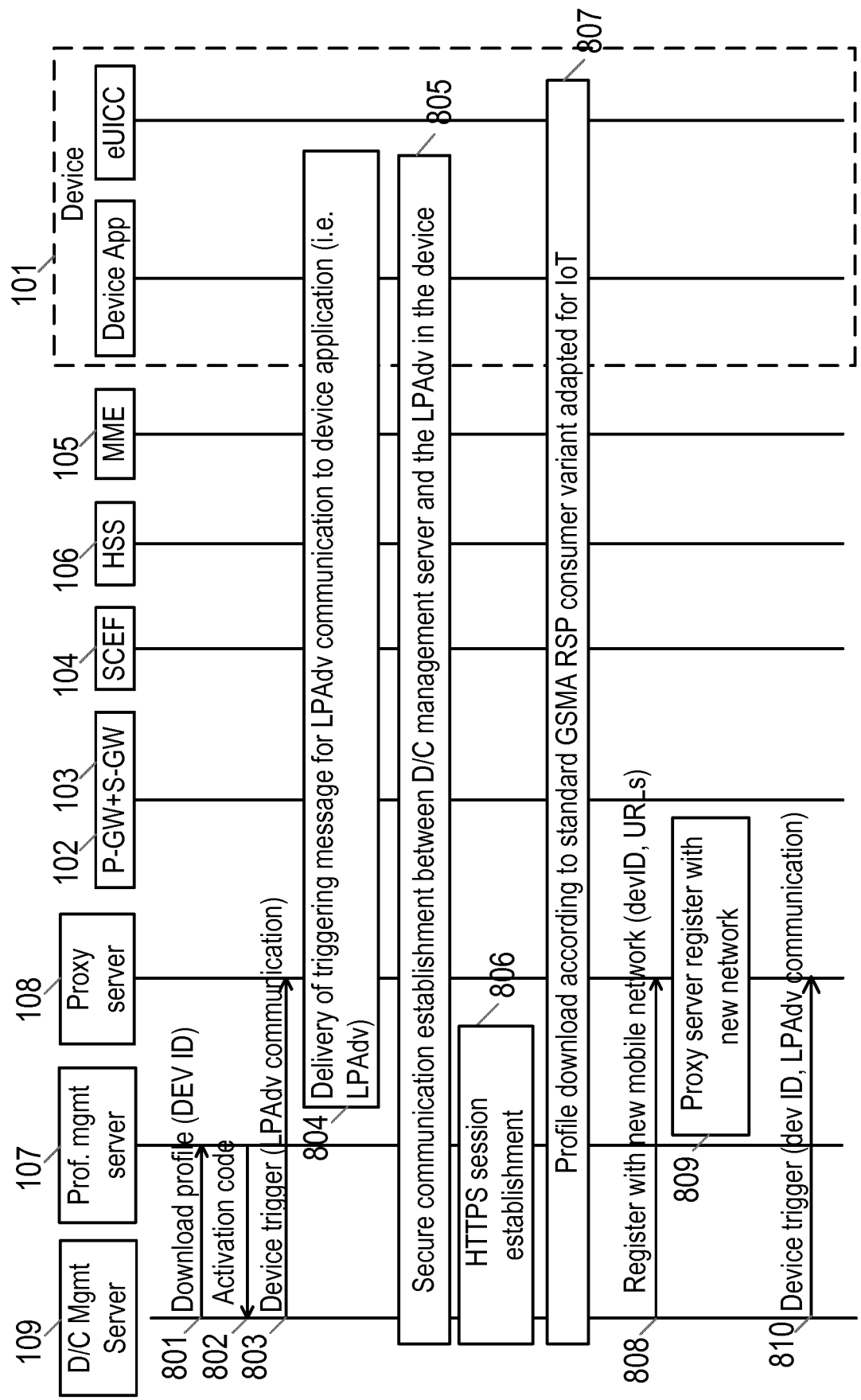
FIGS. 8a to 8b illustrate an example of the profile download and profile enabling flow FIG. 5 where the flow has been redrawn for the adapted consumer variant of GSMA RSP.
Figure 8B:
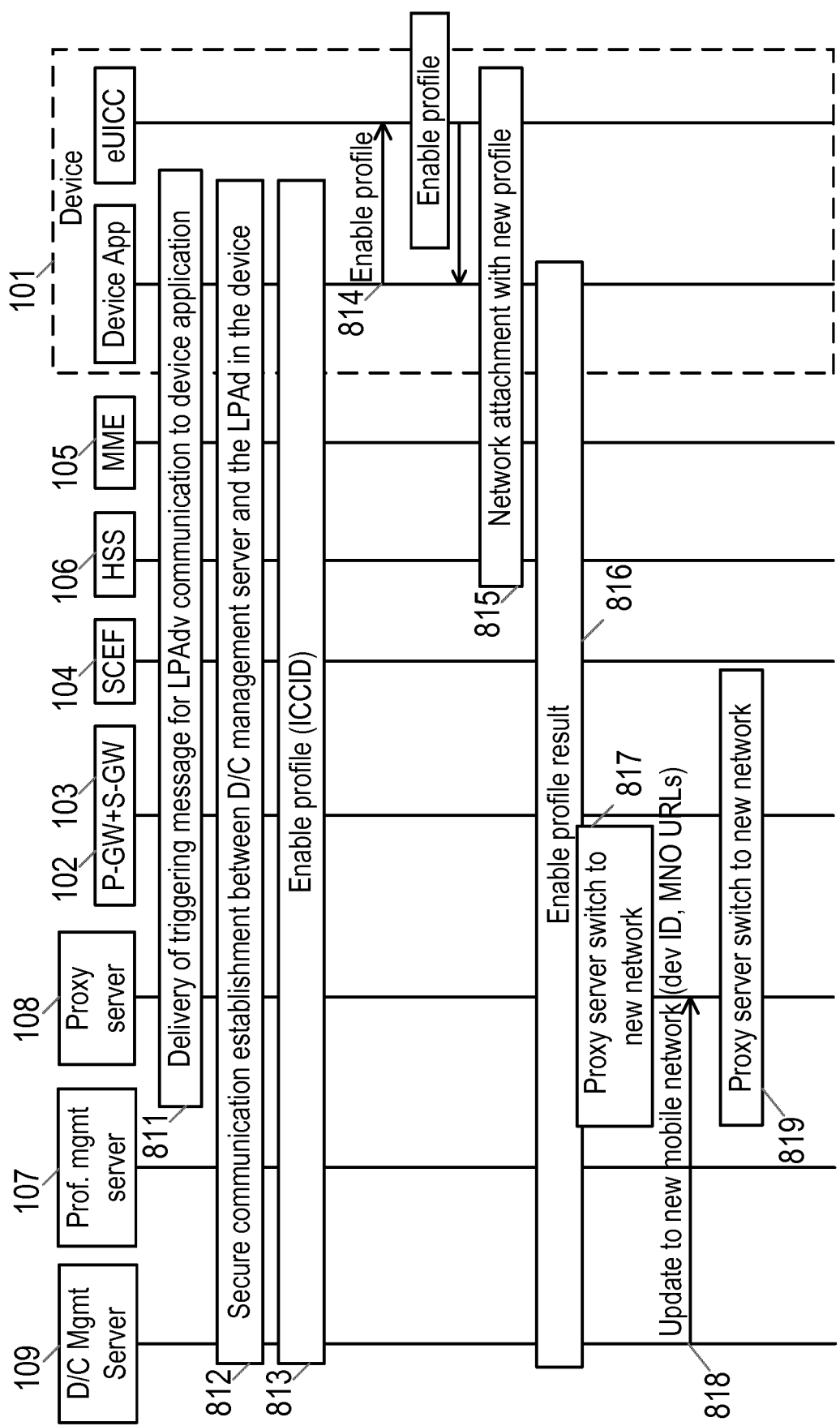

FIG. 8 illustrates an example of the profile download and profile enabling flow FIG. 5 where the flow has been redrawn for the adapted consumer variant of GSMA RSP.

The identity module of the NB-IoT device 101 (for example the eUICC) may be configured with an active cellular subscription (i.e. an enabled profile) allowing the NB-IoT device 101 to connect to a cellular network. This may be a profile installed at manufacturing with the purpose of enabling the provision of an operational profile, or it may be an operation profile previously downloaded by the NB-IoT device 101.

The HSS 106 may be configured with subscriber credentials for the NB-IoT device 101. The subscriber credentials may comprise an external identifier used to address the device via the exposure function 104 (e.g. SCEF). The proxy server 108 may be configured with the external identifier to be able to address the NB-IoT device 101. The profile management server 107 may comprise a set of profile packages which may be available for download. The preparation of these profiles by the profile management server follows from the enterprise owning one or more NB-IoT devices, and ordering profiles for its devices via the MNO portal of the profile management server 107, where the enterprise may have provided device identifiers for its devices. Corresponding profile download information (i.e. profile identifiers to the profile packages) may then have been provided to the enterprise owning the NB-IoT device and may be provided to the D/C Management Server 109. For a given profile package, the HSS 106 of the mobile network corresponding to the profile is configured with subscriber credentials corresponding to those in the profile package, and with the external identifier of the NB-IoT 101.

Steps 801 and 802 relate to the D/C Management Server 109 obtaining profile download information as described above. In step 801, the D/C Management Server 109 transmits a command to the profile management server 107 (MNO portal part) to obtain profile download information (e.g. an activation code). In step 801, the D/C Management Server 109 may provide least provide a device identifier for the NB-IoT device 101 to which the profile is to be downloaded. The device identifier is used to by the profile management server 107 to identify the device for which the profile download shall be triggered. In this example, the device identifier comprises an eUICC ID (EID) or an IMEI.

In step 802, the profile management server 107 transmits a message to the D/C management server 109 comprising an address of the SM-DP+ 107, and a profile download identifier. The address and the profile download identifier may be provided in the form of an activation code. Note that the activation code may be obtained by the enterprise by other means and then configured to the D/C Management Server 109. Steps 801 and 802 may then not be performed.

In step 803, the D/C management server 109 transmits the request to the proxy server 108 to deliver the triggering message to the NB-IoT device 101, wherein the request comprises the device identifier (Step 803 may correspond to step 201 in FIG. 2). Note that if the device is already registered with the D/C Management Server and secure communication is already established between the device and the D/C Management Server the step may be skipped.

In step 804, the proxy server 108 delivers the triggering message to the NB-IoT device identified by the device identifier received in step 803. In particular, the proxy server 108 may determine an external identifier based on the received device identifier in step 803. If the device identifier is different from the external identifier the proxy server 108 uses the provided device identifier to look-up the external identifier in a database. Step 804 may then be implemented as illustrated in FIG. 4.

In step 805, the device application (e.g. the LPAdv 800) in the NB-IoT device 101 triggers establishment of secure communication between the device and the D/C Management Server. Depending on the type of NB-IoT device different protocols may be used. For e.g. NB-IoT devices using IP based communication, step 805 may use TLS/DTLS, and for NB-IoT devices using CoAP step 805 may utilize OSCORE. Note that in case OSCORE is used, a shared security context may already be established, for example using EDHOC, and OSCORE may be directly used. Alternatively, EDHOC may be used for OSCORE security context establishment. Step 805 may only be performed if step 804 is performed.

In step 806, the LPApr, part of D/C Management Server, initiates the profile download flow by establishing secure communication (including mutual authentication) with the profile management server 107. According to GSMA RSP consumer variant step 806 may comprise establishment of an HTTPS session.

In step 807, the profile package is downloaded to the device and installed into the eUICC following the GSMA RSP protocol adapted consumer variant for IoT consisting of a sequence of messages all exchanged within the secure tunnels between profile management server (SM-DP+) and the LPApr of D/C Management Server and between the D/C Management Server and the device (LPAdv), where the LPAdv 800 handles the interaction with the identity module (e.g. the eUICC). This sequence of messages involves the LPApr providing a profile identifier (called matching identifier) and/or the EID of the identity module to the profile management server such that the profile management server knows what profile package in a set of prepared profile packages to download for this particular device. As part of successful profile download LPApr obtains the profile identifier ICCID for use in profile management operations related to the profile.

In this example, the profile is a profile of a new mobile network. In this example therefore, the D/C management server 109 may transmit a request in step 808 to the proxy server 108 to switch to the new mobile network for the NB-IoT device 101. For example, the request to switch to the new mobile network may comprise a request for the proxy server to register with an exposure function, a P-GW etc belonging to the new mobile network. The URLs of the MNO services that the proxy server is being requested to register with may be included in the request. The device identifier may also be included in the request. Note that in case of P-GW the proxy server may be pre-configured for use with NIDD from profile ordering/preparation phase and this step may then be skipped.

In response to step 808, the proxy server may register with the new mobile network in step 809. For example, the proxy server 108 may register with the new mobile network such that any data sent from the NB-IoT device 101 may be routed to application servers through the new mobile network. When this is done the proxy server 108 may be able to receive data from the NB-IoT device through both mobile networks, while still configured to send data to the NB-IoT device through the old mobile network, until it is established that the new profile is enabled and the switch is completed, i.e. the proxy server is configured to send data to the NB-IoT device through the new mobile network.

In this example, the profile may be enabled separately from the download of the profile to the NB-IoT. In this example therefore, in step 807 the profile may be downloaded, and in the step 810 the D/C Management Server 109 may transmit a request to the to the proxy server 108 to trigger enabling of the profile. The request may comprise the device identifier and may indicate LPAdv communication. This step may only be performed if there is not already secure communication established between the D/C management server 109 and the NB-IoT device 101.

In step 811 the proxy server 108 delivers the message to trigger enabling of the downloaded profile to the NB-IoT device 101 identified by the device identifier received in step 810. As described above, in this step the trigger message may be delivered to the NB-IoT device as described in FIG. 4. Step 811 is optional and may not be performed if step 810 is not performed.

In step 812, the device application (e.g. the LPAdv 801) triggers establishment of secure communication between the NB IoT device 101 and the D/C Management Server 107. Depending on the type of device different protocols may be used. For e.g. NB-IoT devices using IP based communication, step 812 may use TLS/DTLS, and for NB-IoT devices using CoAP step 812 may utilize OSCORE. Note that in case OSCORE is used, a shared security context may already be established, using e.g. EDHOC, and OSCORE may be directly used. Alternatively, EDHOC may be used for OSCORE security context establishment. Step 812 may only be performed if step 811 is performed.

In step 813, the D/C management server 109 (e.g the LPApr) transmits a message to the LPAdv 800 to trigger enabling of the new profile. The profile identifier ICCID may also be provided as part of the message.

In step 814, the LPAdv 800 triggers the enabling of the profile with the provided profile identifier at the identity module, and the identity module enables the profile.

In step 815, upon successful enabling of the profile, an attachment to the new network is be performed (as in this example the new profile is with a new mobile network).

In step 816, the LPAdv 800 provides a response to the D/C management server 109 indicating whether the enabling of the profile was successful.

In the delivery of the response in step 816, the proxy server 108 receives traffic from the NB-IoT device 101 via the new mobile network. The proxy server 108 may then decide, in step 817, to switch the mobile network for the NB-IoT device 101 and may from now on send data to the NB-IoT device 101 via the new mobile network.

In response to successful enabling of the profile occurring, and as profile is at a new mobile network operator, the D/C Management Server 109 may instruct in step 818 the proxy server 108 to switch to using services from the new mobile network operator. For example, the proxy server 108 may be instructed to switch to using the exposure function (e.g. SCEF) and/or P-GW at the new mobile network for the particular NB-IoT device for which the profile was changed. The registration with the new mobile network may have occurred earlier. The device identifier of the NB-IoT device may be provided along with the URLs to the different MNO services that are used (SCEF, P-GW, etc.).

In step 819 the proxy server 108 may change its settings such that data from application servers to the NB-IoT device 101 is now forwarded via the new mobile network. The proxy server 108 may also deregister from the old mobile network services.

FIG. 8 is an example flow illustrating how communication between SM-DP+ and the NB IoT device 101/identity module is performed in the case of NB-IoT devices in which NIDD may be used. With the same techniques all GSMA RSP consumer variant flows with adaptation for IoT may be adapted accordingly.

Sending Data to and from the Device (Device Type 1 & 2)

In this section how to send data to and from the NB-IoT device 101 is described. The proxy server 108 offers a service to send messages from application servers to the NB IoT devices and a proxy service relaying messages from NB-IoT devices to application servers and returning response messages. These services are for NB-IoT devices using NIDD. For devices using IP based traffic, communication is typically not via the proxy server 108. Instead standard IP based traffic delivery offered by a mobile network is used and is not further considered here.

In the NIDD case, either via the exposure function 104 or via P-GW 102, the mobile network does not provide a reliable transport between the NB-IoT device 101 and the exposure function 104/P-GW 102. This means the protocol used between the device application in the NB-IoT device 101 and the proxy server 108 may be required to ensure a reliable transport. A Constrained Application Protocol (CoAP) is a commonly used protocol in constrained IoT devices for transfer of application related messages. CoAP provides reliability. Hence, if CoAP is used for the communication then reliability is ensured. If CoAP is not used, the Reliable Data Service (RDS) protocol offered by the mobile network may be used to achieve reliable communication between a device and the exposure function 104/P-GW 102.

Another problem is how each NB-IoT device running NIDD may communicate with multiple application servers. CoAP includes the CoAP options Uri-Host and Uri-Port that may be utilized to provide information to the proxy server about the intended recipient of the message. RDS supports the use of ports which may be used to indicate for which application at the NB-IoT device and what application server exchanged messages are intended. It is up to servers and applications at the device to coordinate the use of ports.

It is important that the provided solution allows end-to-end security between the NB-IoT device 101 and application servers. OSCORE is a protocol for securing CoAP messages that may be used in securing communication where CoAP is used. When using CoAP for routing purpose in the proxy server 108 it may not be possible to use DTLS or TLS to secure messages end-to-end.

Proxy Server Handling with NIDD Via Exposure Function Using CoAP (Device Type 1)

In this section how NB-IoT devices using NIDD via the exposure function (e.g. SCEF) and application servers can send CoAP messages to each other via a proxy server 108 is described.

When an NB-IoT device sends a message to an application server using NI DD it may be required to provide information to the proxy server 108 about the application server. CoAP is using CoAP options where information about the server URI can be provided. These are Uri-Host, Uri-Port, Uri-Path, and Uri-Query. If using OSCORE protected messages between an application server and an NB-IoT device, Uri-Path and Uri-Query are encrypted and integrity protected and may only be readable by the receiver of the CoAP message, in this case the application server. The Uri-Host and Uri-Port may be included in the protected CoAP message which may then be neither encrypted nor integrity protected such that the proxy server 108 can read the information. Normally, when Uri-Host and Uri-Port denotes IP address and UDP/TCP port these options are left out as the information can be deduced from the UDP or TCP layer. However, in this case at least the Uri-Host option, but possibly also the Uri-Port option, may be included by the NB-IoT device in each CoAP request message for the proxy operation to work. The flow is illustrated in FIG. 9.

Figure 9A:
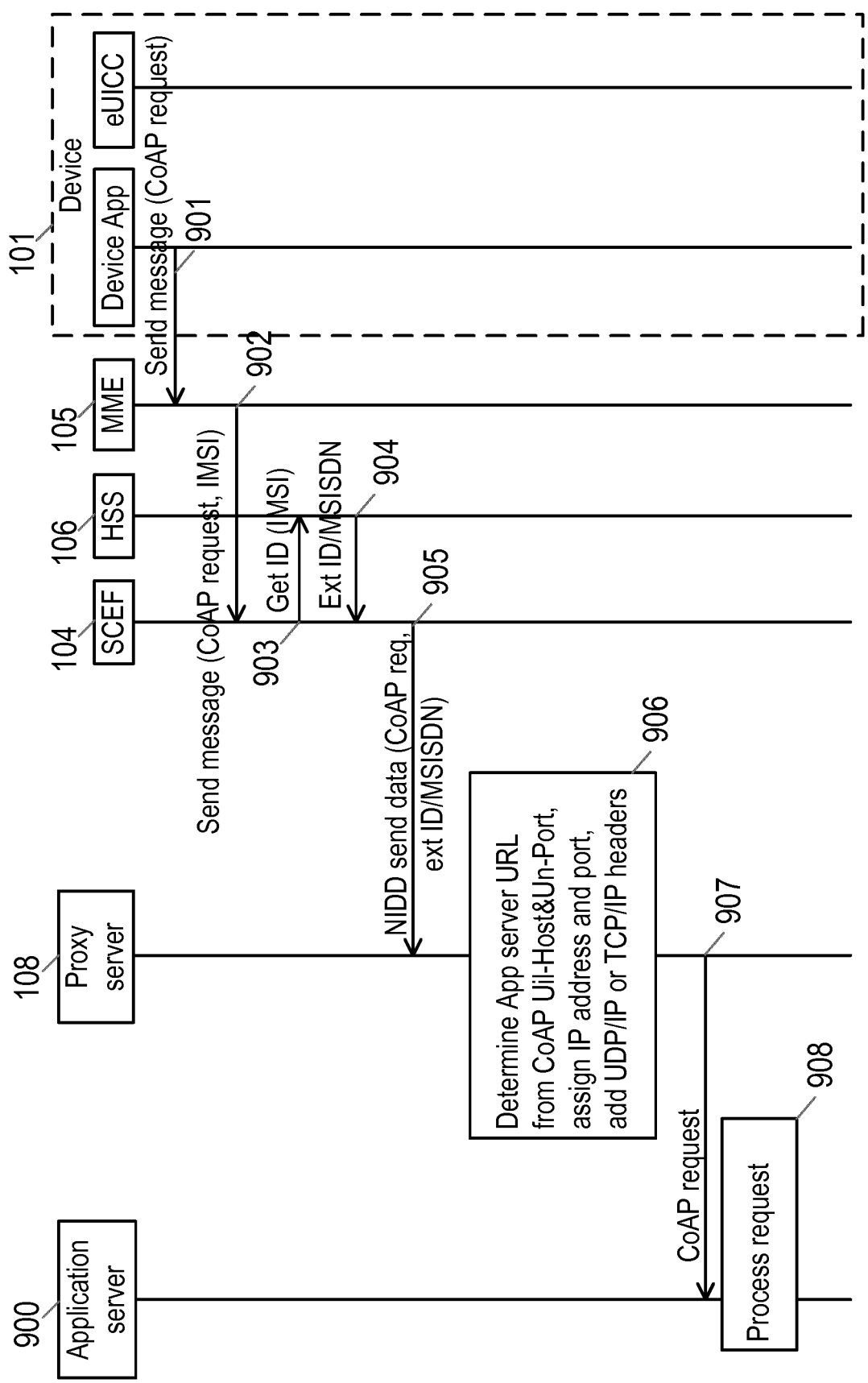
FIGS. 9a to 9b illustrate transmitting a CoAP request from an NB-IoT device to an application server using NIDD via the exposure function.
Figure 9B:
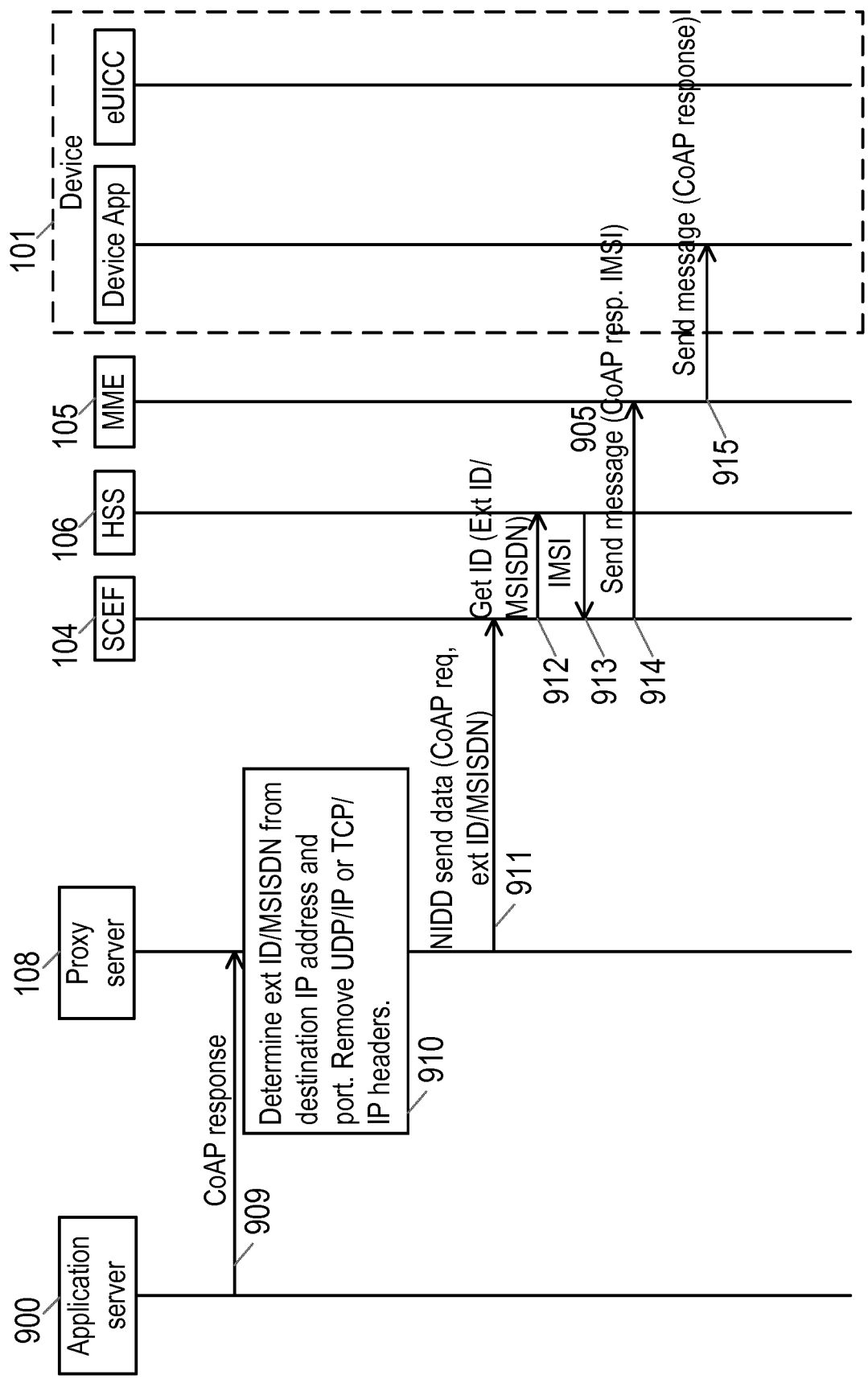

FIG. 9 illustrates transmitting a CoAP request from an NB-IoT device to an application server using NIDD via the exposure function 104.

The device application in the NB-IoT device 101 prepares a CoAP request. In this example, the Uri-Host and possible Uri-Port are included in the CoAP request to provide information of recipient.

In step 901, the device application transmits the CoAP request using the NIDD service. The CoAP request is delivered to the MME 105.

In step 902, the MME 105 transmits the CoAP request to the exposure function 104 (in this examples the SCEF). The MME may include the device identifier (e.g. ISMI) in the forwarded message.

In step 903, the exposure function transmits a request for an external identifier for the device to the HSS 106. The request comprises the device identifier received in step 902.

In step 904, the HSS looks up the external identifier based on the received device identifier, and transmits the external identifier to the exposure function 104.

In step 905, the exposure function 104, forwards the CoAP request to the proxy server including the external identifier.

In step 906, the proxy server 108 determines where to send the CoAP request based on the Uri-Host and Uri-Port number of the CoAP request message (the destination IP address and UDP/TCP port number may be obtained, possibly via DNS look-up). The proxy server 108 performs Network Address Translation, NAT, and assigns IP address and port numbers for each NB-IoT device that sends a request message. Each NB-IoT device may obtain a unique IPv6 address or IPv4 address+port number. These are used as source address when forwarding a CoAP request message. The proxy server 108 may add TCP/IP or UDP/IP headers to the CoAP request using the information determined above, and forwards the CoAP request in step 907 to the application server 900. The proxy server 108 stores a mapping of assigned IPv6/IPv4 address+port and external identifier or MSISDN of the NB-IoT device 101.

In step 908, the application server 900 processes the CoAP request message and provides a CoAP response message in step 909. The response is routed back to the proxy server 108 based on the IP address and port used.

In step 910, the proxy server 108 uses the destination address and port of the response message to look up the external identifier or MSISDN of the NB-IoT device 101 and removes the TCP/IP or UDP/IP headers from the CoAP response. In step 911, the proxy server 108 uses the exposure function NIDD send data command to transmit the CoAP response message as data while indicating the external identifier or MSISDN.

In step 912, the exposure function transmits a request for a device identifier for the NB-IoT device to the HSS 106. The request comprises the external identifier received in step 911.

In step 913, the HSS looks up the device identifier based on the external identifier, and transmits the device identifier (e.g. IMSI) to the exposure function 104.

In step 914, the exposure function NIDD service forwards the CoAP response message to the MME, which then forwards the CoAP response to the intended NB-IoT device in step 915 where, based on the CoAP message ID and CoAP token values, the CoAP response is connected to a CoAP request and can be forwarded to the correct application running at the device.

Note that a CoAP response here may also be followed by a CoAP request from the application to the device where the CoAP request is linked to the CoAP request from the device through the use of the same CoAP token. The proxy server will route both messages back to the device according to the above description.

In order to minimize the number of bytes sent for each message in an intense data exchange, the CoAP Uri-Host and Uri-Port options may be transmitted in the first CoAP request and may then be left out in the future CoAP request messages from the NB-IoT device. When the proxy server receives a CoAP request message without Uri-Host, Uri-Port, and Uri-Path options, it may be configured to forward the message to the same application server as the last message from the same NB-IoT device was forwarded to.

The proxy server 108 may assign a static IPv6 address for the NB-IoT device 101, or the proxy server 108 may present a CoAP resource for application servers to use when addressing a particular device. In the latter case, the proxy server 108 may use the Uri-Path CoAP option to indicate the resource name and/or device identifier known to application servers (the device identifier could be the name of the resource). Note that an unprotected Uri-Path CoAP option may then be included in addition to the protected Uri-Path option related resources of the NB-IoT device being addressed. (In case of an unprotected CoAP message the first part of the path may be the resource name of the proxy server 108 and the device identifier followed by the intended resource path on the NB-IoT device). The proxy server may then consume (for example, delete before forwarding) the unprotected Uri-Path option (or the first part of the path in case of an unprotected CoAP message). The proxy server 108 may have stored a mapping of external identifier to static IPv6 address or resource name/device identifier. The proxy server 108 may also store a mapping of external identifier, application server IP address and port, and the CoAP message ID and CoAP token values.

Figure 10A:
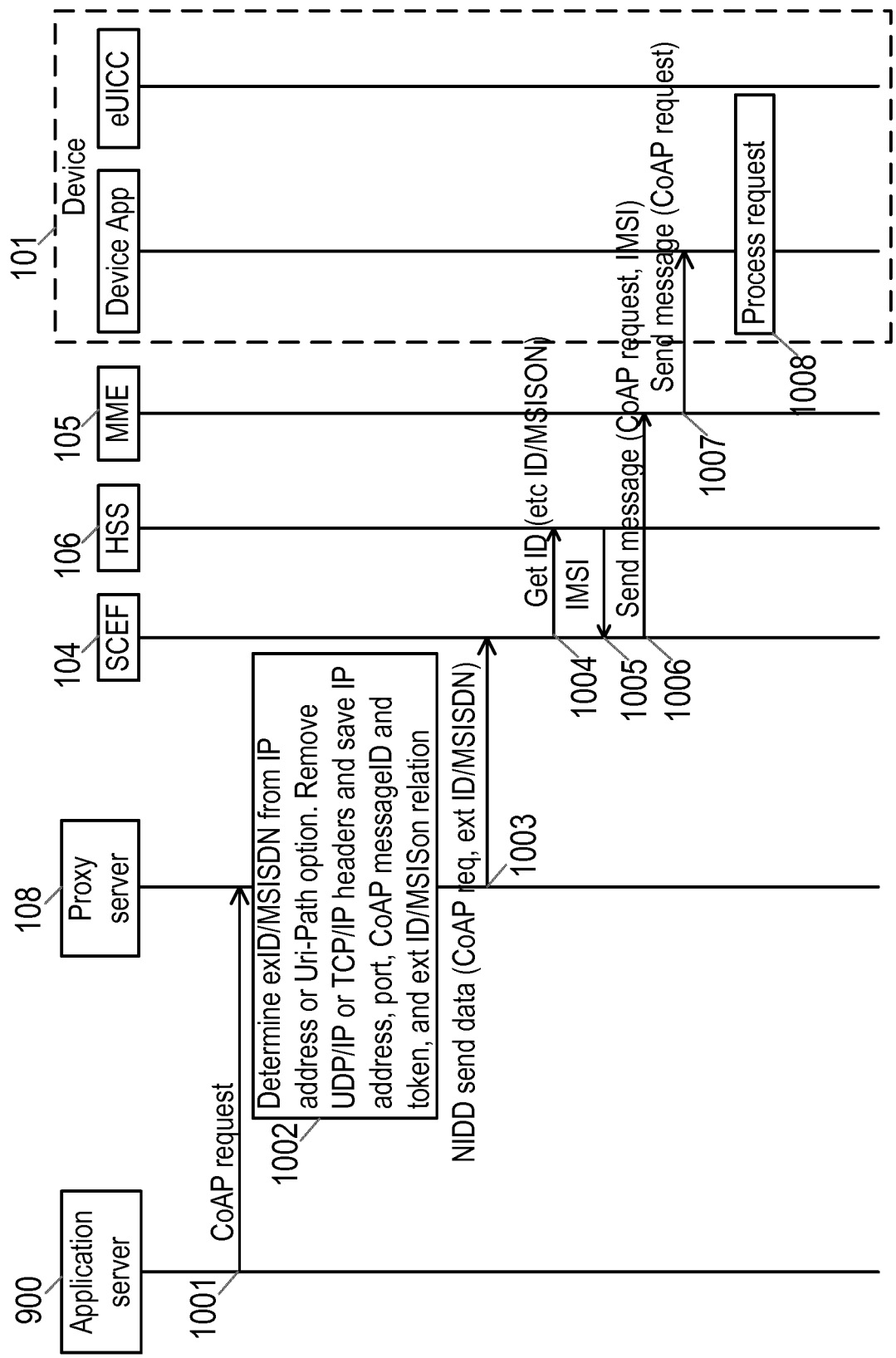
FIGS. 10a to 10b illustrate transmitting a CoAP request from an application server 900 to an NB-IoT device 101 using NIDD via the exposure function.
Figure 10B:
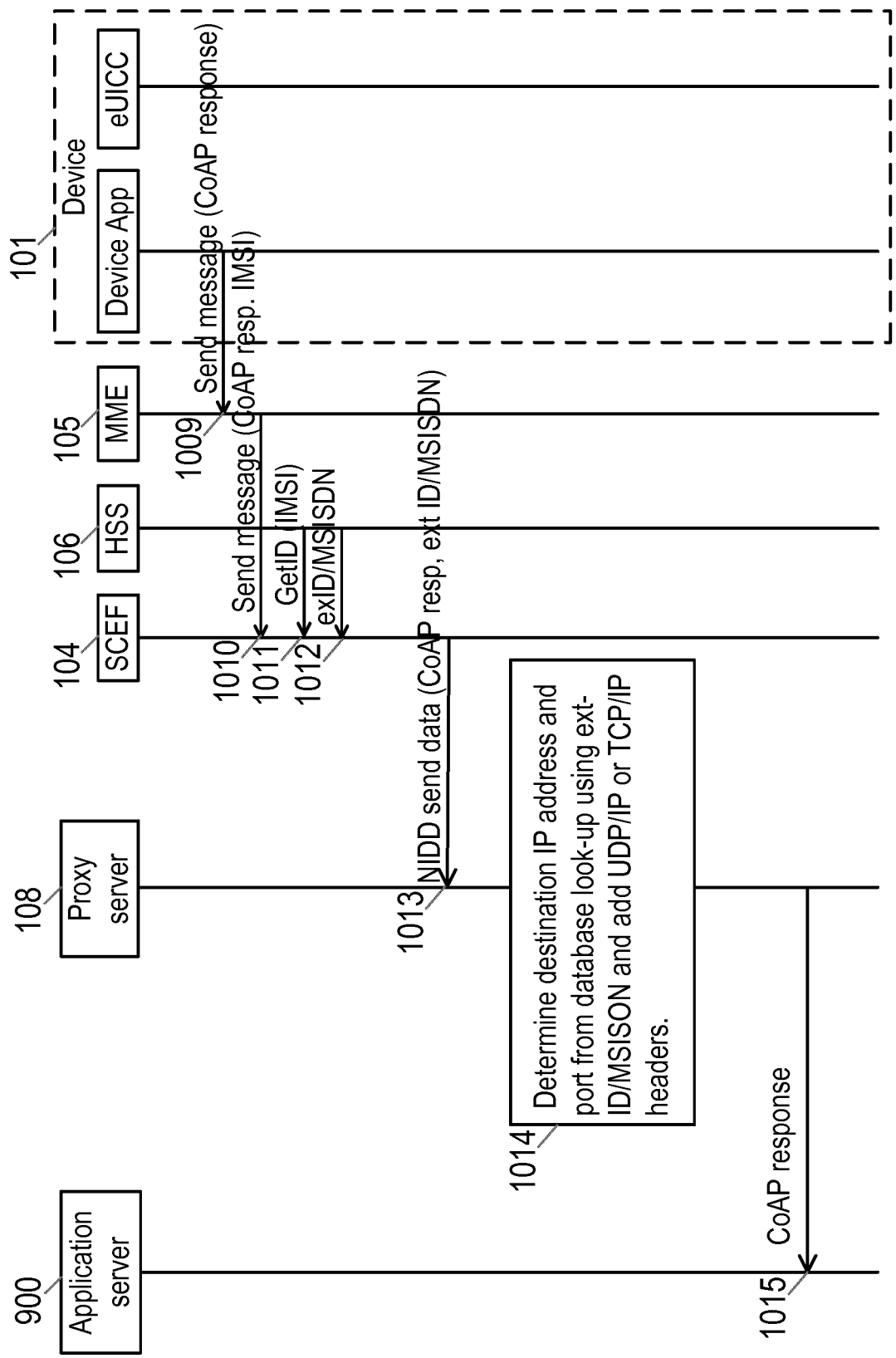

FIG. 10 illustrates transmitting a CoAP request from an application server 900 to an NB-IoT device 101 using NIDD via the exposure function 104.

The application server prepares a CoAP request. An IP address or Uri-Path option identifies the NB-IoT device to which the request is addressed.

In step 1001, the application server 900 transmits the CoAP request to the proxy server 108.

In step 1002, the proxy server 108 analyzes the IP address, port, and possibly unprotected Uri-Path of the received CoAP request to determine if the CoAP request is for the proxy server 108 itself or for an NB-IoT device. In case of an NB-IoT device, the external identifier for the NB-IoT device is obtained using a database look-up and the proxy server 108 transmits, in step 1003, the CoAP request with the external identifier to the exposure function 104. The exposure function NIDD send data command is used to send the CoAP request data to the NB-IoT device.

In step 1004, the exposure function transmits a request to the HSS 106 for the device identifier associated with the external identifier received in step 1003.

In step 1005, the exposure function receives the corresponding device identifier, which in this example comprises an ISMI.

In step 1006, the exposure function 104 transmits the CoAP request with the device identifier to the MME 105.

In step 1007 the MME 105 transmits the CoAP request to the device 101.

In step 1008, the NB-IoT device 101 processes the request. Based on the addressed resource the correct application is invoked and a response is prepared. In step 1009 the NB-IoT device 101 transmits a CoAP response to the MME 105.

In step 1008, the NB-IoT device 101 provides a CoAP response where the CoAP message ID and CoAP token values from the CoAP request are used according to standard CoAP processing. The CoAP response may then be sent using NIDD to the exposure function 104.

For example, in step 1009, the NB-IoT device forwards the CoAP response to the MME which forwards the CoAP response to the exposure function in step 1010 along with the device identifier.

In step 1011, the exposure function 104 transmits a request to the HSS 106 for an external identifier associated with the device identifier received in step 1010. In step 1012, the exposure function 104 receives the external identifier from the HSS 106. In step 1013, the exposure function 104 forwards the CoAP response to the proxy server 108 with the external identifier.

In step 1014, the proxy server 108 processes the CoAP response. Based on the received external identifier and the CoAP message ID and/or CoAP token, the proxy server 108 may determine, from a database, the application server IP address and port to which it will forward the CoAP response. The proxy server 108 may the add TCP/IP or UDP/IP headers to the CoAP response using the information determined above, and forwards the CoAP response to the application server 900 in step 1015. The source IP address and port may be those used in the CoAP request, which can be determined from the external identifier.

Proxy Server Handling with NIDD Via P-GW Using CoAP (Device Type 2)

In this section how devices using NIDD via P-GW and application servers can send CoAP messages to each other via a proxy server is described.

The NB-IoT device may prepare a CoAP message in the same way as was described with reference to FIG. 9. The CoAP may instead by forwarded to a P-GW 102 using NIDD. The P-GW 102 may add UDP/IP headers and may forward the message to the proxy server 108. The source IP address and UDP port may be the IP address and port that the P-GW 102 has assigned for the NB-IoT device from which the CoAP message originated. The proxy server 108 may determine the IP address and port of the application server 900 and may forward the CoAP message to the application server 900 in the same way as described with reference to FIG. 9. The proxy server 108 may keep the IP address of the NB-IoT device 101 as assigned by the P-GW 102 or may assign a new IP address for the NB-IoT device 101 and may store the mapping between the two IP addresses in a database. The latter option has advantages in case the IP address of the NB-IoT device 101 used in the P-GW 102 changes due to a mobile operator change, while a static address may be kept by the proxy server 108.

The application server 900 may then process the CoAP request and may provide a CoAP response. The CoAP response may be routed back to the proxy server 108 based on the IP address and port used, and further routed to the P-GW 102 by the proxy server 108 (or directly to P-GW 102 if the original IP address is kept). The P-GW 102 may determine based on the IP address and port of the CoAP response, the NB-IoT device to which the CoAP response shall be forwarded, may remove the UDP/IP headers, and forward the CoAP response (via the S-GW 103 and MME 105) to the NB-IoT device. At the NB-IoT device, based on the CoAP message ID and CoAP token values, the CoAP response may be connected to a CoAP request and may be forwarded to the correct application running at the NB-IoT device.

In some examples, the proxy server 108 may have assigned a static IPv6 address for the NB-IoT device that is used by the application server to send a CoAP request. The proxy server 108 may keep track of the IP address of the NB-IoT device as assigned by the P-GW 102. This may be done by querying the IP address based on external identifier. The proxy server 108 may forward the CoAP request using the IP address as assigned by the P-GW 102. A dedicated port for non-IP traffic may then be used. Alternatively, the proxy server 108 may present a CoAP resource for application servers to use when addressing a particular device similar as described with reference to FIG. 10. The proxy server 108 may use a mobile core network service to retrieve the current IP address (and possibly port) of the NB-IoT device based on the external identifier connected to the resource name. The proxy server 108 may the forward the CoAP request to the P-GW 102 (using the IP address of the NB-IoT device as the destination address). The P-GW may then remove the UDP/IP headers and forward the message to the NB-IoT device (via S-GW and MME) using the NIDD service. The proxy server 108 may store a mapping of the device IP address and port, application server IP address and port, and the CoAP message ID and CoAP token values.

The NB-IoT device may provide a CoAP response where the CoAP message ID and CoAP token values from the CoAP request are used according to standard CoAP processing. The CoAP response may be sent using NIDD to the P-GW 102 that may add UDP/IP headers and forward the CoAP response to the proxy server 108. The proxy server 108 may process the CoAP response. Based on the source IP address and port, CoAP message ID and/or CoAP token, the proxy server 108 may determine, from a database, the application server IP address and port to which it shall forward the CoAP response.

Proxy Server Handling with NIDD Via SCEF Using RDS (Device Type 1)

In this section how devices using NIDD via SCEF and application servers can send messages to each other via a proxy server where RDS is utilized is described. RDS is implemented in the NB-IoT device 101 and in the exposure function 104 (e.g. the SCEF). We assume here that the NB-IoT device 101 and proxy server 108 are configured with a set of RDS ports linking applications of the NB-IoT device 101 and application servers 900. Such a configuration may typically be configured in the NB-IoT device 101 and in the proxy server 108 by a device management server associated with each NB-IoT device 101 and may be updated during runtime. Communication with the device management server may use a static RDS port configured during manufacturing of the NB-IoT device and configured into the proxy server 108 when set-up for the first time.

Figure 11A:
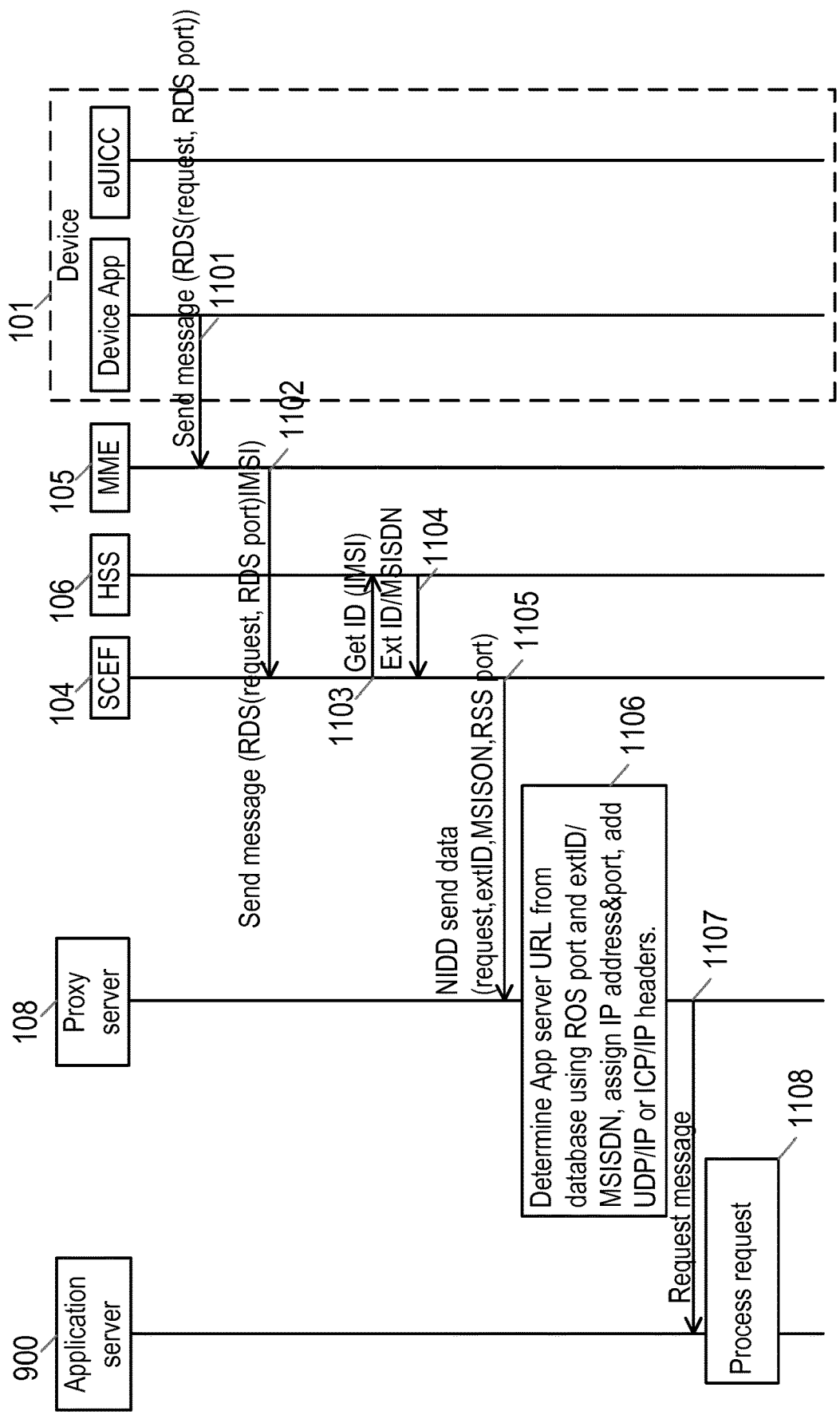
FIGS. 11a to 11b illustrate transmitting a request message from an NB-IoT device to an application server using NIDD via the exposure function where RDS is used.
Figure 11B:
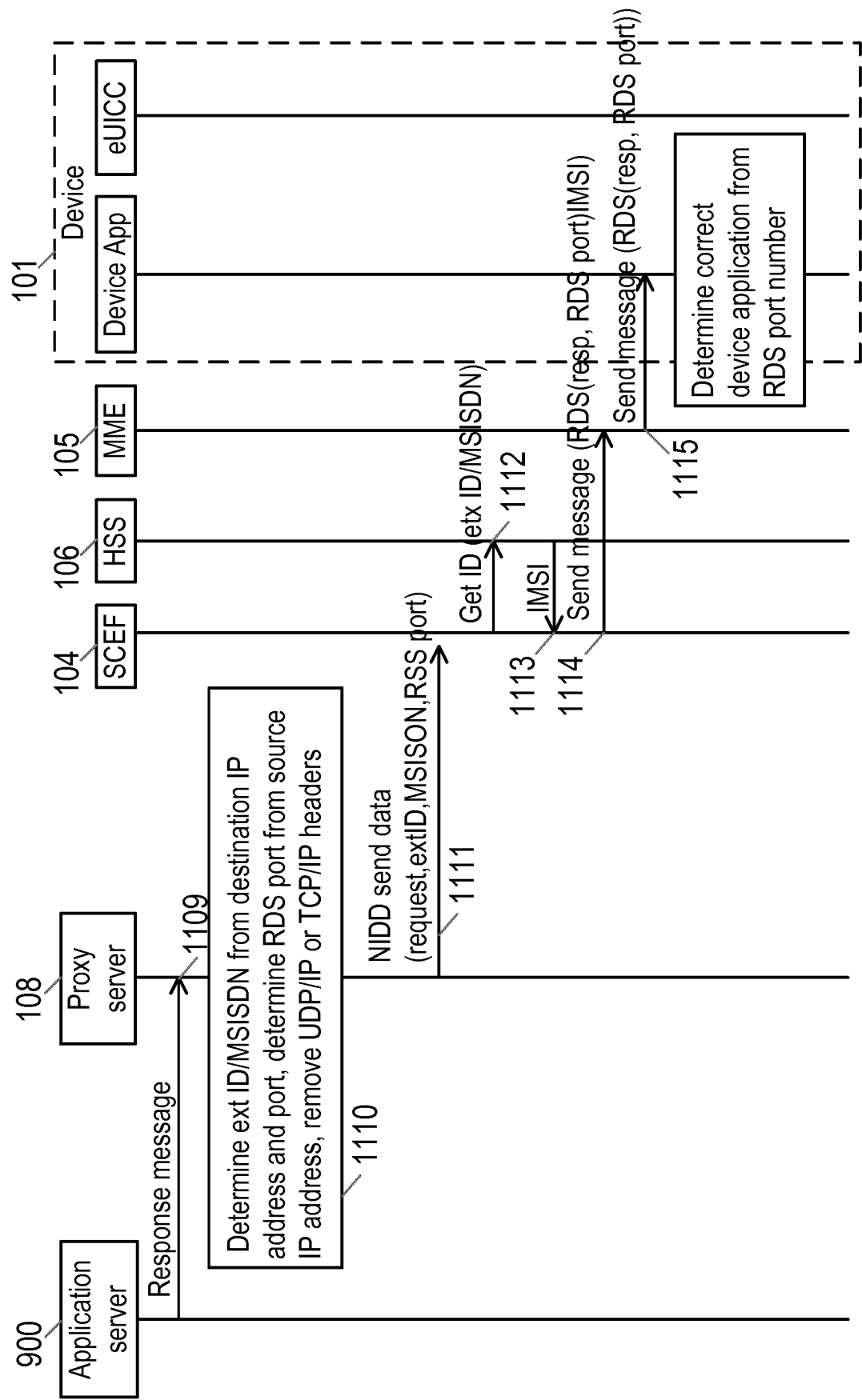

FIG. 11 illustrates transmitting a request message from an NB-IoT device to an application server using NIDD via the exposure function where RDS is used.

In step 1101, the device application transmits a request message using the NIDD service. The RDS protocol is used where the request message is the payload and RDS port number is set according to what application server the request message is targeting. The request message is delivered to the MME 105.

In step 1102, the MME 105 transmits the request message to the exposure function 104 (in this example, the SCEF). The MME 105 may include the device identifier (e.g. ISMI) in the forwarded message.

In step 1103, the exposure function 104 transmits a request for an external identifier for the device to the HSS 106. The request comprises the device identifier received in step 1102.

In step 1104, the HSS 106 looks up the external identifier based on the received device identifier and transmits the external identifier to the exposure function 104.

In step 1105, the exposure function 104, forwards the request message to the proxy server 108 including the external identifier and the RDS port number.

In step 1106, the proxy server 108 determines the destination IP address and port form the external identifier and the RDS port. The address of the application server 900 and forwarding method e.g. using TCP/IP with the request message as payload, is known from the database. The proxy server has assigned an IP address for the NB-IoT device similar to as described above and a mapping between IP address and external identifier may be stored in a database accessible by the proxy server 108.

In step 1107, the proxy server forwards the request message to the application server 900 associated with RDS port number in the database accessible by the proxy server 108.

In step 1108, the application server 900 processes the request message and provides an response message in step 1109. The response message is routed back to the proxy server 108 based on the IP address and port used.

In step 1110, the proxy server 108 uses the destination address and port of the response message to look up the external identifier of the NB-IoT device 101 and removes the TCP/IP or UDP/IP headers from the response message. In step 1111, the proxy server 108 uses the exposure function NIDD send data command to transmit the response message as data (RDS protocol payload) while indicating the external identifier and the RDS port.

In step 1112, the exposure function transmits a request for a device identifier for the NB-IoT device to the HSS 106. The request comprises the external identifier received in step 1111.

In step 1113, the HSS looks up the device identifier based on the external identifier and transmits the device identifier (e.g. IMSI) to the exposure function 104.

In step 1114, the exposure function NIDD service forwards the response message to the MME 105, which then forwards the response message to the intended NB-IoT device in step 1115 where, based on the based on the RDS port, the response message is forwarded to the correct application running at the device.

The proxy server may assign a static IPv6 address for the device, or the proxy server presents a resource for application servers to use when addressing a particular device. In the latter case, the application server may use the URI to indicate the resource name and/or device identifier known to application servers (the device identifier could be the name of the resource). The proxy server has stored a mapping of external identifier or MSISDN to static IPv6 address or resource name/device identifier. The proxy server also stores a mapping of RDS port numbers and application server IP address or domain name.

Figure 12A:
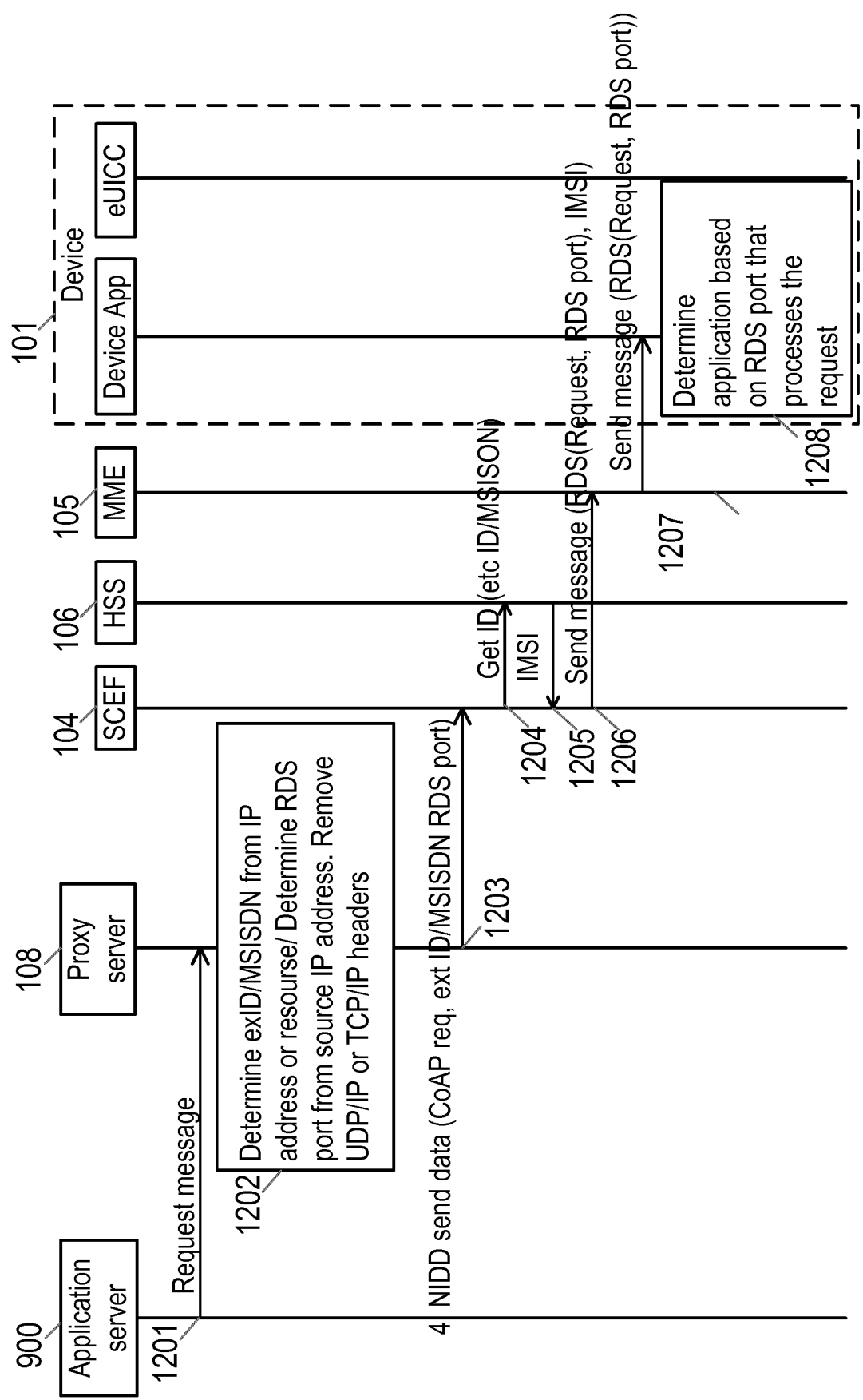
FIGS. 12a to 12b illustrate transmitting a request message from an application server to an NB-IoT device using NIDD via the exposure function 104 and where RDS is used.
Figure 12B:
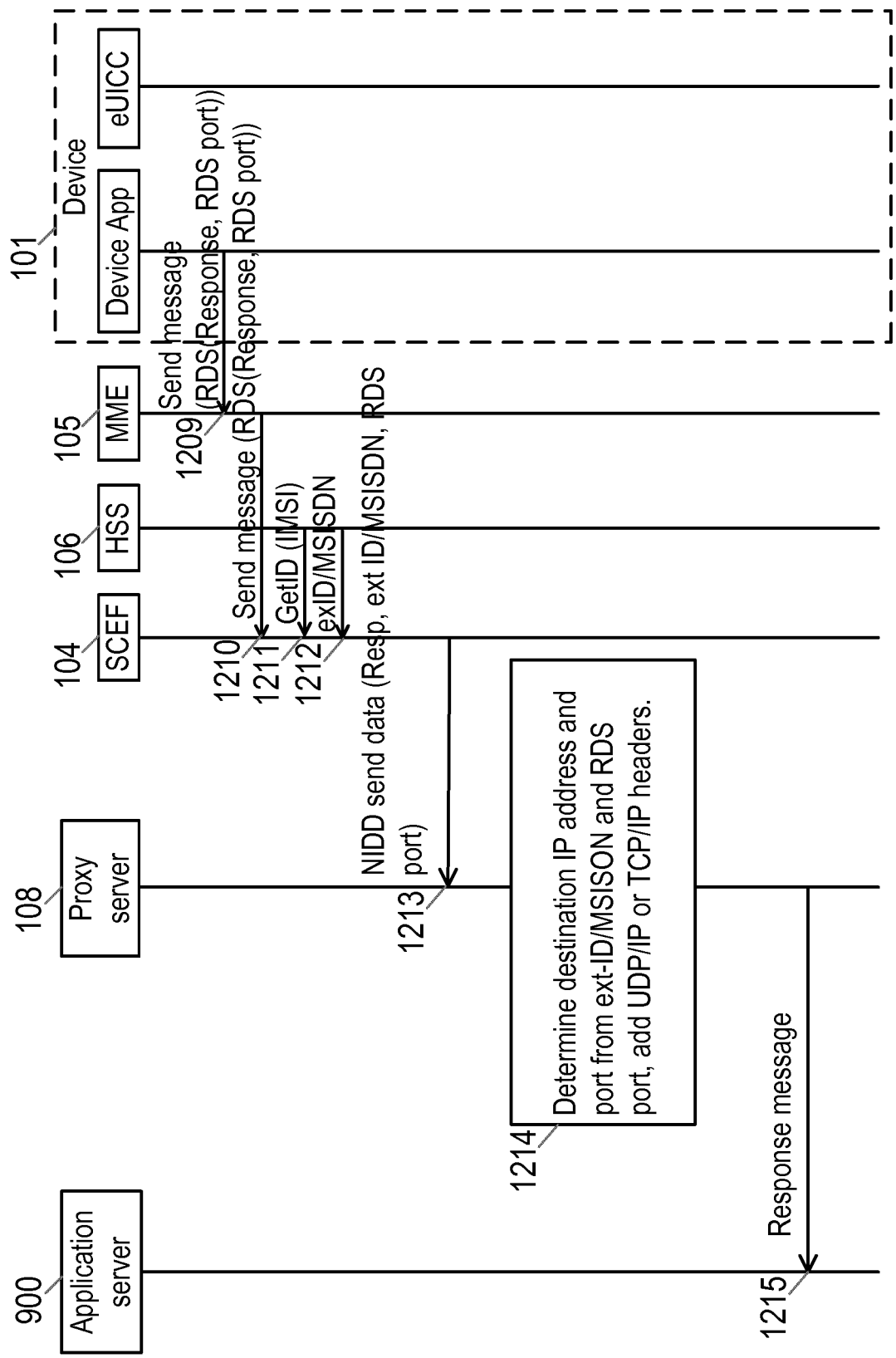

FIG. 12 illustrates transmitting an request message from an application server 900 to an NB-IoT device 101 using NIDD via the exposure function 104 and where RDS is used.

The application server prepares a request message. An IP address or proxy server resource identifies the NB-IoT device to which the request is addressed.

In step 1201, the application server 900 transmits the request message to the proxy server 108.

In step 1202, the proxy server 108 analyzes the IP address, port, and possibly the URI, of the received request message to determine if the RDS request is for the proxy server 108 itself or for an NB-IoT device. In case of an NB-IoT device, the external identifier for the NB-IoT device is obtained using a database look-up and the proxy server 108 transmits, in step 1203, the request message with the external identifier to the exposure function 104. The exposure function NIDD send data command is used to send the request message to the NB-IoT device. The RDS port is configured by the proxy server based on look-up on the source IP address.

In step 1204, the exposure function transmits a request to the HSS 106 for the device identifier associated with the external identifier received in step 1203.

In step 1205, the exposure function receives the corresponding device identifier, which in this example comprises an ISMI.

In step 1206, the exposure function 104 transmits the request message with the device identifier to the MME 105.

In step 1207 the MME 105 transmits the request message to the device 101.

In step 1208, the NB-IoT device 101 processes the request message. Based on the RDS port the correct application is invoked at the NB-IoT device 101 and a response message is prepared. In step 1209 the NB-IoT device 101 transmits a response message that is delivered to the MME 105.

In step 1208, the NB-IoT device 101 provides a response message which may be sent using NIDD to the exposure function 104.

For example, in step 1209, the NB-IoT device 101 forwards the response message to the MME 105 which forwards the response message to the exposure function 104 in step 1210 along with the device identifier.

In step 1211, the exposure function 104 transmits a request to the HSS 106 for an external identifier associated with the device identifier received in step 1210. In step 1212, the exposure function 104 receives the external identifier from the HSS 106. In step 1213, the exposure function 104 forwards the response message to the proxy server 108 with the external identifier and the RDS port number.

In step 1214, the proxy server 108 processes the response message. Based on the received external identifier and the RDS port number, the proxy server 108 may determine, from a database, the application server IP address and port to which it will forward the response message. The forwarding method valid for this particular RDS port, for example, TCP/IP may be obtained from the database. The proxy server 108 may the forward the response message to the application server 900 in step 1215 according to the appropriate forwarding method. The source IP address and port may be those used in the request message, which can be determined from the external identifier.

Proxy Server Handling with NIDD Via P-GW Using RDS (Device Type 2)

In this section how devices using NIDD via P-GW and application servers can send messages to each other via a proxy server and where RDS is utilized is described. It is not clearly specified in 3GPP specs if and how RDS ports can be used with a P-GW. In embodiments described herein, a range of User Datagram Protocol (UDP) ports may be used for non-IP data delivery mode at the P-GW. Each UDP port may map to an RDS port. The RDS port number may then be signaled between the P-GW 102 and the proxy server 108 by using the different UDP port numbers.

The NB-IoT device may prepare a request message in the same way as described with reference to FIG. 11 which may be forwarded to the P-GW 102 using NIDD. The P-GW 102 may the forward the request message to the proxy server 108. The source IP address and is the IP address that the P-GW 102 has assigned for the NB-IoT device 101 from which the request message originated. The UDP source port number indicates the RDS port. The proxy server 108 may then forward the request message to the correct application server 900 in the same way as was described with reference to FIG. 11.

The application server 900 may process the request message and may provide a response message. The response message may be routed back to the proxy server 108 based on the IP address and port used, and then further routed to the P-GW 102 as described with reference to FIG. 11 with the addition that the RDS port is reflected in the UDP port according to what was described above. The P-GW 102 may then determine, based on the IP address and port of the response message, the NB-IoT device to which the response message shall be forwarded. The P-GW 102 may remove the UDP/IP headers, and forward the response message. The RDS port that is used is determined from the destination UDP port number. At the NB-IoT device, based on the RDS port, the response message may be forwarded to the correct application running at the device.

In some examples, the proxy server 108 may have assigned a static IPv6 address for the NB-IoT device that is used by the application server to send a request message to NB-IoT device. Alternatively, the proxy server 108 may present a resource for application servers to use when addressing a particular NB-IoT device. The proxy server determines the RDS port to be used as described with reference to FIG. 12. The proxy server 108 may then forward the request message to the P-GW where a dedicated port for non-IP traffic connected based on the RDS port number is used. P-GW may remove the UDP/IP headers and forward the request message to the NB-IoT device using the NIDD service. The proxy server 108 may store a mapping of the device IP address and port, RDS port, and possibly application server IP address and port.

The NB-IoT device may provide a response message that may be transmitted using NIDD to the P-GW. The P-GW 102 may add the UDP/IP headers and forward the response message to the proxy server 108. The proxy server 108 may process the response. Based on the source IP address and port, the proxy server 108 may determine, from a database, the application server IP address and port to which it shall forward the response message.

Proxy Server Handling Using NIDD Service with Compressed IP Traffic (Device Type 1 & 2)

In order to remove the impact of TCP/IP or UDP/IP headers it is possible to utilize the NIDD service but instead of sending non-IP as payload data, compressed IP data may be sent as payload. By sending compressed IP data as payload, the NB-IoT device and either proxy server or SCEF/P-GW may be required to handle the UDP/IP or TCP/IP compression. There exist different schemes that may be used e.g. Robust Header Compression (ROHC), Generic Header Compression (GHC) for IPv6 over Low-Power Wireless Personal Area Networks (6LoWPANs), and Low-Power Wireless Area Network (LPWAN) Static Context Header Compression (SCHC). Currently neither SCEF nor P-GW supports header compression schemes. How efficient these schemes are compared to removing UDP/IP or TCP/IP headers likely depends on how much data the device is sending.

When using compressed IP based traffic, the addressing of several application servers may be solved without using CoAP options and use of RDS ports. RDS may still be needed for reliable transfer between the NB-IoT device and the SCEF/P-GW. If header compression is supported in the exposure function 104, then the proxy server 108 may only relay packets between application servers and the exposure function 104. The proxy server 108 may still set the source IP address of outgoing packets such that responses are routed via the proxy server 108 on the way back. In case exposure function 104 does not support header compression, the proxy server 108 may, in addition to the above, also implement this part. For incoming packets from application servers, the solution may be the same as what has been described earlier using static IP addresses or resource per device. The proxy server 108 may then compress packets before sending them to the exposure function 104.

If the P-GW 102 supports header compression it would be possible to manage without the proxy server 108 for data transmitted from the NB-IoT device to the application servers. For triggering messages, and possibly also data from application servers to NB-IoT devices, the proxy server 108 may still be required. If the proxy server 108 implements header compression the solution is the same as for the exposure function example, with the differences due to NIDD via P-GW as described above.

It will be appreciated that CoAP and RDS may both be used, and different hybrid solutions envisaged to solve reliability and communication with several application servers.

Secure Communication Using NIDD

Secure communication end-to-end between an NB-IoT device and an application server may be achieved in different ways depending on if RDS or CoAP is utilized. With RDS it is possible to use TLS or DTLS for secure communication between the NB-IoT device and the application server (depending on what transport protocol, TCP or UDP, is used between proxy server and the application server). Note here that TLS/DTLS messages may be transferred directly on top of RDS. When using CoAP (and no RDS) the CoAP header may be in plaintext for proxy server operations. Clearly, TLS/DTLS may then not be used at the transport layer and it may be recommended to use OSCORE for securing the communication end-to-end. EDHOC may then be used to establish an OSCORE master secret shared between the two parties needed to establish the shared security context. Additional alternatives may also possible using application specific solutions utilizing for example COSE for securing messages.

GSMA RSP M2M Variant: Sending Profile Download and Profile Management Data to and from Devices In this section problems related to communication with the profile management server are addressed.

Consider two different cases: communication where an HTTPS (or CAT_TP) session is established between the identity module and the profile management server, and delivery of an SMS formatted message from the NB-IoT device to the profile management server. The first case applies to devices of types 1 and 2 and the latter applies to all types of devices.

Communication Using HTTPS (or CAT_TP) Session

The GSMA RSP M2M variant involves establishing an HTTPS session (or CAT_TP session) between the identity module and the SM-SR (part of the profile management server) and sending HTTPS data (or CAT_TP data) between the two endpoints. The Bearer Independent Protocol (BIP) may be used in the NB-IoT device for communication between the identity module and the NB-IoT device. With the BIP protocol the identity module can open and close a communication channel towards an SM-SR and send and receive data. The SM-SR may not be known to the NB-IoT device/identity module before the triggering message is received in step 605 of FIG. 6. To communicate directly with the SM-SR via IP based traffic, it may be required for TCP/IP to be supported in the NB-IoT device. A constrained NB-IoT device that supports the CoAP/UDP/IP stack may not support TCP and may be configured to use communication via NIDD when communicating with the profile management server.

When RDS is used, the RDS port number for use in the communication with SM-SR must then be configured in the device and in the proxy server such that it is possible to establish the secure communication in step 606 of FIG. 6. It is the role of D/C Management Server 109 to configure the RDS port numbers. The RDS port number may for example be included as part of the triggering message when sent from the D/C Management Server 109 in step 603 of FIG. 6. As part of step 603 the D/C Management Server 109 may also configure the RDS port number to the proxy server 108. Associated with the RDS port number, information as to whether UDP/IP or TCP/IP communication should be used at the proxy server 108 may also be provided.

When CoAP is used as bearer for all communication from the NB-IoT device towards all application servers, and RDS is not used, special solutions may be required for non-CoAP based communications with application servers such as the HTTPS (or CAT_TP) based traffic with SM-SR. The non-CoAP based messages may be carried as CoAP payload between the proxy server 108 and the NB-IoT device. The proxy server 108 may need to remove the CoAP header before forwarding messages from the NB-IoT device to the SM-SR and may add a CoAP header before forwarding messages from the SM-SR towards the NB-IoT device. A special resource may be used at the proxy server 108 that the NB-IoT devices can write to in order to have this particular proxy server behaviour apply. For example, the Uri-Host option may be set to "proxy", Uri-Port option is not used, and the Uri-Path option may be set to indicate this resource name followed by forwarding mechanism (UDP or TCP), host name, port, and resource name at the NB-IoT device where the response can be written. The proxy server can then use different UDP/TCP port numbers when forwarding traffic from the NB-IoT device compared to "ordinary" CoAP traffic such that it may recognize for which traffic back from application servers that it should add a CoAP header. The proxy server may need to save CoAP message ID and CoAP token value such that it can link responses from the application server to the CoAP requests received from the application server. A special resource at the NB-IoT device may be used for profile download and profile management data that the proxy server uses when writing data from the application server to the NB-IoT device. When writing to this resource the data may be sent to the application driving the identity module that forwards the data to the identity module using the BIP protocol.

In the same way as described above, in case of several CoAP messages are being sent from the NB-IoT device to the special resource of the proxy server for forwarding of HTTPS messages, then the Uri-Host and Uri-Path options may be included only in the first CoAP request message and proxy server may treat following CoAP request messages without these options in the same way.

Delivery of SMS-Formatted Message

For the delivery of SMS-formatted messages from NB-IoT devices to the profile management server, a dedicated URL may be used which is different from the one used in the section entitled "Communication using HTTPS (or CAT_TP) session". The URL may be configured to the proxy server 108 by the D/C Management server 109. When RDS is used the same type of solution as described in "Communication using HTTPS (or CAT_TP) session" applies but with a dedicated RDS port. The use of this RDS port in a message from the NB-IoT device results in the proxy server 108 writing this message (the SMS-formatted data) to the dedicated URL registered for this port. This may be an HTTP-based interface or low-level socket interface. The proxy server 108 may be pre-registered at the profile management server 107 allowing it to write messages. The SMS-formatted data may be protected following standard mechanisms defined in GSMA RSP M2M variant. The SMS-formatted data may contain a sender identifier (e.g. EID) for the profile management server 107 to determine the sender of the message.

In examples in which CoAP is used for delivery of the message, the same applies as described "Communication using HTTPS (or CAT_TP) session" but with a dedicated resource different from the one in "Communication using HTTPS (or CAT_TP) session" for handling of SMS-formatted messages. The writing to this resource triggers the proxy server to send the message to the profile management server in the same way as described above in the RDS case.

GSMA RSP Consumer Variant: Sending Profile Download and Profile Management Data to and from Devices In this section HTTPS based communication between the LPAd of the device and the profile management server is considered. This applies to devices of types 1 and 2. As explained above, a constrained NB-IoT device that supports the CoAP/UDP/IP stack may not support TCP and may be configured to use communication via NIDD when communicating with the profile management server 107. Here the same solution as described in "Communication using HTTPS (or CAT_TP) session" applies for the two cases where either RDS is used or CoAP is used to transport the HTTPS messages to between the proxy server and the device and where the proxy server handles transfer of messages further to the profile management server.

For the GSMA RSP consumer variant adapted for IoT the HTTPS may be moved out of the device and may not require any special handling by the proxy server 108.

For the secure communication between the D/C Management Server 109 and the NB-IoT device the techniques described in "Sending data to and from the device (Device Type 1 & 2)" applies. The triggering messages sent from the D/C Management Server 109 to the NB-IoT device 101 in steps 703 to 704 and 712 to 713 of FIG. 7 and in steps 803 to 804 and 810 to 811 of FIG. 8 may not be required to be protected.

Update Proxy Server to Use Services of New MNO

As shown in FIGS. 5, 6, 7, and 8, when enabling a new profile of a new mobile network operator, the NIDD and monitoring services that the proxy server uses from the current mobile network need to switch to the new mobile network operator. As shown above the proxy server 108 may be instructed by the D/C Management Server 109 to register with the services of the new mobile network as soon as there is decision to switch to the new network, i.e., when the profile of the new network is about to be disabled. The proxy server 108 may be registered with the NIDD service from more than one mobile network at a time. For data from NB-IoT devices to application servers the proxy server 108 may store information from which network the data came from, and may route data back to the same network. However, for data from application servers to a NB-IoT device, the proxy server 108 may need to be aware of which network the NB-IoT device is currently is at. In some example, the proxy server 108 stays at the current network until it receives data from the new network and then switches all traffic to the new network. When the D/C Management Server 109 receives acknowledgement (for example from the profile management server 107) that profile enabling was successful, this may be signalled to the proxy server 108 which can then deregister from the services of the previous network.

It may be the case that different external identifiers (e.g. MSISDNs) are used for the same NB-IoT device with different mobile networks. In this example, the new external identifier may be configured at the proxy server by the D/C Management Server 109 when instructing the proxy server 108 to register with the services of the new mobile network. The proxy server 108 may then translate between the two external identifiers until the switch between profiles in completed, in which case the old external identifier may be forgotten.

Proxy Server Merged with Device/Connectivity (D/C) Management Server

In some examples, the proxy server 108 and the D/C Management Server 109 are one and the same server. The D/C Management Server 109 may therefore have knowledge of the NB-IoT devices, and which application servers they communicate with as well as being the proxy server 108 aiding the NB-IoT devices in the communication with these application servers.

Figure 13:
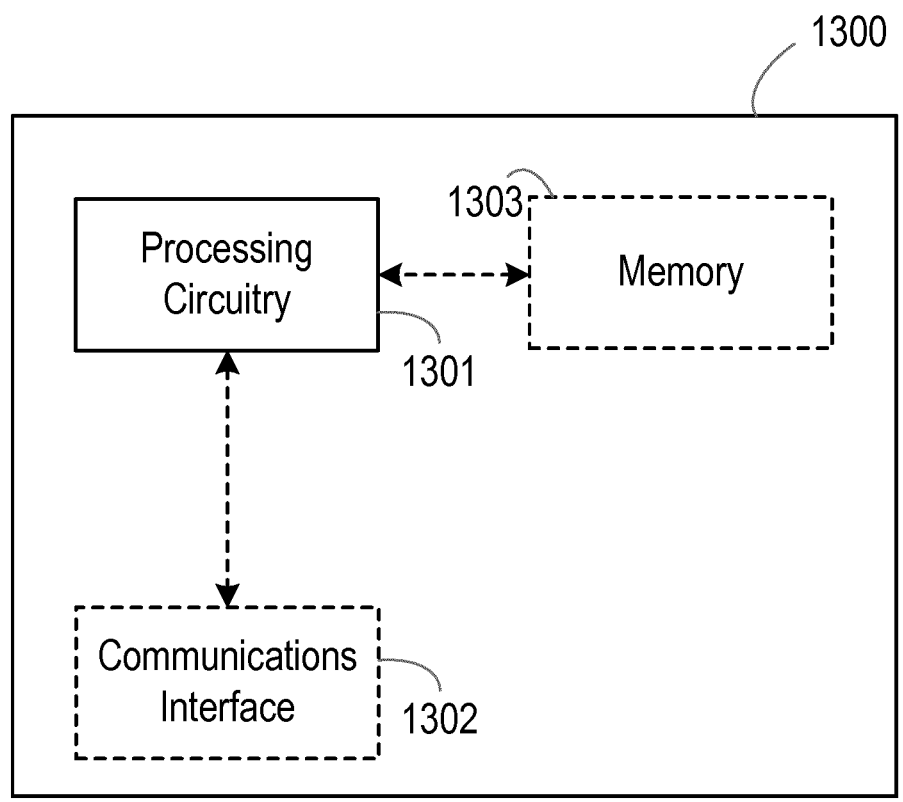
FIG. 13 illustrates a proxy server comprising processing circuitry (or logic)

FIG. 13 illustrates a proxy server 1300 comprising processing circuitry (or logic) 1301. The processing circuitry 1301 controls the operation of the proxy server 1300 and can implement the method described herein in relation to a proxy server 1300 (for example proxy server 108). The processing circuitry 1301 can comprise one or more processors, processing units, multi-core processors or modules that are configured or programmed to control the proxy server 1300 in the manner described herein. In particular implementations, the processing circuitry 1301 can comprise a plurality of software and/or hardware modules that are each configured to perform, or are for performing, individual or multiple steps of the method described herein in relation to the proxy server 1300.

Briefly, the processing circuitry 1301 of the proxy server 1300 is configured to: receive a request to deliver a triggering message to the NB-IoT device, wherein the request comprises a device identifier; determine an external identifier based on the received device identifier; and deliver the triggering message to the NB-IoT device using the external identifier.

In some embodiments, the proxy server 1300 may optionally comprise a communications interface 1302. The communications interface 1302 of the proxy server 1300 can be for use in communicating with other nodes, such as other virtual nodes. For example, the communications interface 1302 of the proxy server 1300 can be configured to transmit to and/or receive from other nodes requests, resources, information, data, signals, or similar. The processing circuitry 1301 of proxy server 1300 may be configured to control the communications interface 1302 of the proxy server 1300 to transmit to and/or receive from other nodes requests, resources, information, data, signals, or similar.

Optionally, the proxy server 1300 may comprise a memory 1303. In some embodiments, the memory 1303 of the proxy server 1300 can be configured to store program code that can be executed by the processing circuitry 1301 of the proxy server 1300 to perform the method described herein in relation to the proxy server 1300. Alternatively or in addition, the memory 1303 of the proxy server 1300, can be configured to store any requests, resources, information, data, signals, or similar that are described herein. The processing circuitry 1301 of the proxy server 1300 may be configured to control the memory 1303 of the proxy server 1300 to store any requests, resources, information, data, signals, or similar that are described herein.

Figure 14:
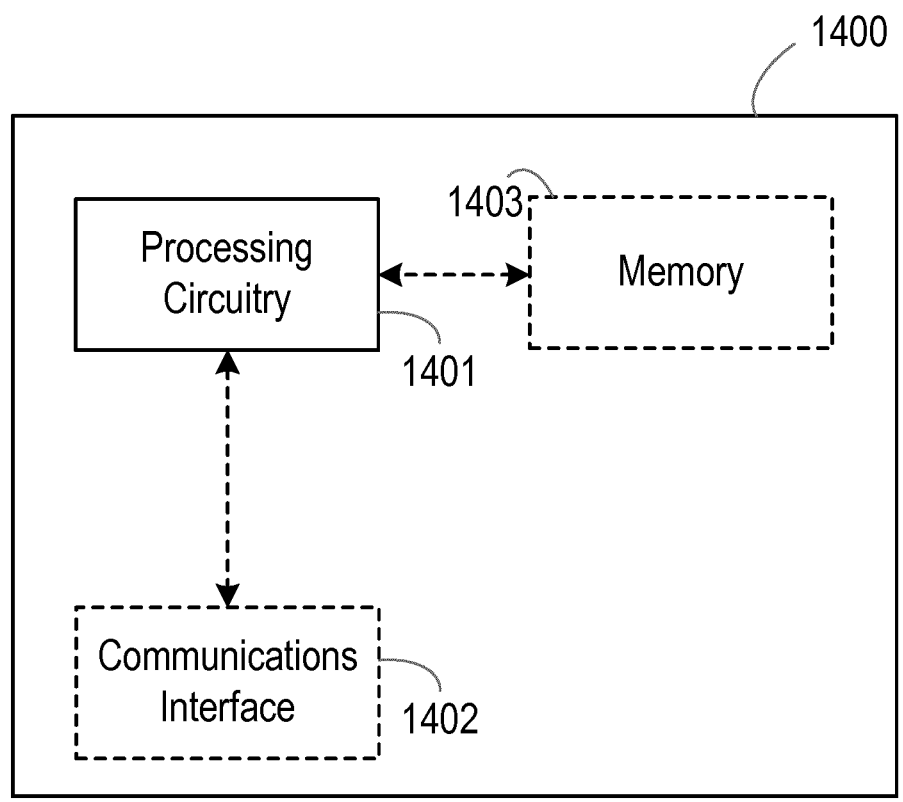
FIG. 14 illustrates a Device and Connectivity (D/C) Management Server comprising processing circuitry (or logic)

FIG. 14 illustrates a Device and Connectivity (D/C) Management Server 1400 comprising processing circuitry (or logic) 1401. The processing circuitry 1401 controls the operation of the D/C Management Server 1400 and can implement the method described herein in relation to a D/C Management Server 1400 (for example D/C Management Server 108). The processing circuitry 1401 can comprise one or more processors, processing units, multi-core processors or modules that are configured or programmed to control the D/C Management Server 1400 in the manner described herein. In particular implementations, the processing circuitry 1401 can comprise a plurality of software and/or hardware modules that are each configured to perform, or are for performing, individual or multiple steps of the method described herein in relation to the D/C Management Server 1400.

Briefly, the processing circuitry 1401 of the D/C Management Server 1400 is configured to: transmit a request to a proxy server to deliver a triggering message to the NB-IoT device, wherein the request comprises a device identifier and the triggering message.

In some embodiments, the D/C Management Server 1400 may optionally comprise a communications interface 1402. The communications interface 1402 of the D/C Management Server 1400 can be for use in communicating with other nodes, such as other virtual nodes. For example, the communications interface 1402 of the D/C Management Server 1400 can be configured to transmit to and/or receive from other nodes requests, resources, information, data, signals, or similar. The processing circuitry 1401 of D/C Management Server 1400 may be configured to control the communications interface 1402 of the D/C Management Server 1400 to transmit to and/or receive from other nodes requests, resources, information, data, signals, or similar.

Optionally, the D/C Management Server 1400 may comprise a memory 1403. In some embodiments, the memory 1403 of the D/C Management Server 1400 can be configured to store program code that can be executed by the processing circuitry 1401 of the D/C Management Server 1400 to perform the method described herein in relation to the D/C Management Server 1400. Alternatively or in addition, the memory 1403 of the D/C Management Server 1400, can be configured to store any requests, resources, information, data, signals, or similar that are described herein. The processing circuitry 1401 of the D/C Management Server 1400 may be configured to control the memory 1403 of the D/C Management Server 1400 to store any requests, resources, information, data, signals, or similar that are described herein.

Figure 15:
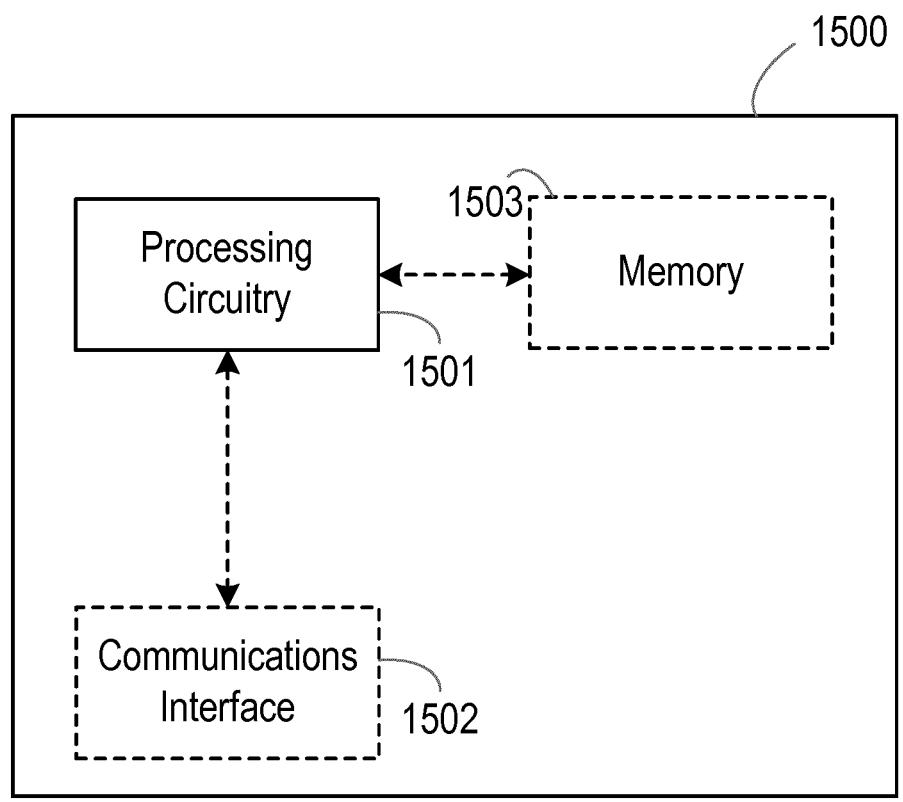
FIG. 15 illustrates a Narrow Band Internet of Things (NB-IoT) device comprising processing circuitry (or logic).

FIG. 15 illustrates a Narrow Band Internet of Things (NB-IoT) device 1500 comprising processing circuitry (or logic) 1501. The processing circuitry 1501 controls the operation of the NB-IoT device 1500 and can implement the method described herein in relation to a NB-IoT device 1500 (for example NB-IoT device 108). The processing circuitry 1501 can comprise one or more processors, processing units, multi-core processors or modules that are configured or programmed to control the NB-IoT device 1500 in the manner described herein. In particular implementations, the processing circuitry 1501 can comprise a plurality of software and/or hardware modules that are each configured to perform, or are for performing, individual or multiple steps of the method described herein in relation to the NB-IoT device 1500.

Briefly, the processing circuitry 1501 of the NB-IoT device 1500 is configured to: receive a triggering message delivered by a proxy server.

In some embodiments, the NB-IoT device 1500 may optionally comprise a communications interface 1502. The communications interface 1502 of the NB-IoT device 1500 can be for use in communicating with other nodes, such as other virtual nodes. For example, the communications interface 1502 of the NB-IoT device 1500 can be configured to transmit to and/or receive from other nodes requests, resources, information, data, signals, or similar. The processing circuitry 1501 of NB-IoT device 1500 may be configured to control the communications interface 1502 of the NB-IoT device 1500 to transmit to and/or receive from other nodes requests, resources, information, data, signals, or similar.

Optionally, the NB-IoT device 1500 may comprise a memory 1503. In some embodiments, the memory 1503 of the NB-IoT device 1500 can be configured to store program code that can be executed by the processing circuitry 1501 of the NB-IoT device 1500 to perform the method described herein in relation to the NB-IoT device 1500. Alternatively or in addition, the memory 1503 of the NB-IoT device 1500, can be configured to store any requests, resources, information, data, signals, or similar that are described herein. The processing circuitry 1501 of the NB-IoT device 1500 may be configured to control the memory 1503 of the NB-IoT device 1500 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a proxy server, for enabling remote management of a profile in an identity module in a Narrowband Internet of Things (NB-IOT) device; wherein the proxy server is configured with access to a database of one or more external identifiers each associated with a respective one of one or more NB-IOT devices; wherein the one or more external identifiers are each used to address the respective one of the one or more NB-IOT devices via an exposure function in a core network; the method comprising:

receiving a request to deliver a triggering message to the NB-IOT device, wherein the request comprises a device identifier of the NB-IOT device;

determining, from the database, an external identifier of the NB-IOT device based on the device identifier of the NB-Iot device; and transmitting the triggering message along with the external identifier to the exposure function for forwarding to the NB-IOT device using a Non-IP Data Delivery (NIDD) service; wherein the triggering message comprises:

a profile download triggering message configured to trigger the NB-IOT device to download a profile from a profile management server; or a profile management triggering message configured to trigger an identity module in the NB-IOT device to perform a profile management operation.

2. The method of claim 1, wherein the triggering message comprises a Uniform Resource Locator (URL) of a profile management server in the core network.

3. The method of claim 1, wherein the triggering message comprises an identification of a Device and Connectivity Management server.

4. The method of claim 1, wherein the request is received from a profile management server.

5. The method of claim 1, wherein the request is received from a Device and Connectivity Management server.

6. A proxy server, for enabling remote management of a profile in an identity module in a Narrowband Internet of Things (NB-IOT) device; wherein the proxy server is configured with access to a database of one or more external identifiers each associated with a respective one of one or more NB-IOT devices; wherein the one or more external identifiers are each used to address the respective one of the one or more NB-IOT devices via an exposure function in a core network; the proxy server comprising:
   processing circuitry;
   memory containing instructions executable by the processing circuitry whereby the proxy server is operative to:
      receive a request to deliver a triggering message to the NB-IOT device, wherein the request comprises a device identifier of the NB-IOT device;
      determine, from the database, an external identifier of the NB-IOT device based on the device identifier of the NB-Iot device; and
      transmit the triggering message along with the external identifier to the exposure function for forwarding to the NB-IOT device using a Non-IP Data Delivery (NIDD) service; wherein the triggering message either comprises:
         a profile download triggering message configured to trigger the NB-IOT device to download a profile from a profile management server; or
         a profile management triggering message configured to trigger an identity module in the NB-IOT device to perform a profile management operation.

7. The proxy server of claim 6, wherein the triggering message comprises a Uniform Resource Locator (URL) of a profile management server in the core network.

8. The proxy server of claim 6, wherein the triggering message comprises an identification of a Device and Connectivity Management server.

9. The proxy server of claim 6, wherein the instructions are such that the proxy server is operative to receive the request from a profile management server.

10. The proxy server of claim 6, wherein the instructions are such that the proxy server is operative to receive the request from a Device and Connectivity Management server.

* * * * *

UNITED STATES PATENT AND TRADEMARK OFFICE
CERTIFICATE OF CORRECTION

PATENT NO. : 12,069,045 B2
APPLICATION NO. : 17/642380
DATED : August 20, 2024
INVENTOR(S) : Ståhl et al.

It is certified that error appears in the above-identified patent and that said Letters Patent is hereby corrected as shown below:

On the Title Page

On Page 2, item (56), under "OTHER PUBLICATIONS", in Column 2, Lines 3-4, delete "Network(E-UTRAN)" and insert -- Network (E-UTRAN) --, therefor.

In the Drawings

In Fig. 12a, Sheet 19 of 23, for Tag "1202", Line 2, delete "resourse/" and insert -- resource/ --, therefor.

In the Specification

In Column 1, Line 49, delete "generated" and insert -- to generate --, therefor.

In Column 4, Line 62, delete "not" and insert -- not to --, therefor.

In Column 5, Line 36, delete "total" and insert -- total of --, therefor.

In Column 7, Line 54, delete "packet gateway" and insert -- packet data network gateway --, therefor.

In Column 8, Line 41, delete "names" and insert -- named --, therefor.

In Column 9, Line 41, delete "his" and insert -- its --, therefor.

In Column 9, Line 47, delete "(ICCID," and insert -- (ICCID), --, therefor.

In Column 12, Line 34, delete "used to" and insert -- used --, therefor.

In Column 13, Line 47, delete "to the to the" and insert -- to the --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,069,045 B2

In Column 14, Line 34, delete "NB-IotT" and insert -- NB-IoT --, therefor.

In Column 16, Line 1, delete "as when" and insert -- when --, therefor.

In Column 16, Line 39, delete "used to" and insert -- used --, therefor.

In Column 17, Line 65, delete "request to the" and insert -- request --, therefor.

In Column 18, Line 46, delete "is be" and insert -- is --, therefor.

In Column 19, Line 39, delete "FIG. 7" and insert -- FIG. 7. --, therefor.

In Column 19, Line 63, delete "being" and insert -- is being --, therefor.

In Column 20, Lines 35-36, delete "provide least provide" and insert -- at least provide --, therefor.

In Column 20, Line 38, delete "used to" and insert -- used --, therefor.

In Column 22, Line 17, delete "request to the" and insert -- request --, therefor.

In Column 22, Line 47, delete "indicated" and insert -- indicates --, therefor.

In Column 22, Line 55, delete "is be" and insert -- is --, therefor.

In Column 24, Line 21, delete "provide least provide" and insert -- at least provide --, therefor.

In Column 24, Line 23, delete "used to" and insert -- used --, therefor.

In Column 25, Line 51, delete "request to the" and insert -- request --, therefor.

In Column 26, Line 17, delete "is be" and insert -- is --, therefor.

In Column 30, Line 10, delete "may the" and insert -- may --, therefor.

In Column 30, Line 23, delete "by" and insert -- be --, therefor.

In Column 31, Line 3, delete "may the" and insert -- may --, therefor.

In Column 31, Line 63, delete "form" and insert -- from --, therefor.

In Column 32, Line 32, delete "based on the based on the" and insert -- based on the --, therefor.

In Column 32, Line 64, delete "on the" and insert -- of the --, therefor.

In Column 33, Line 34, delete "may the" and insert -- may --, therefor.

CERTIFICATE OF CORRECTION (continued)
U.S. Pat. No. 12,069,045 B2

In Column 33, Line 54, delete "may the" and insert -- may --, therefor.

In Column 33, Line 55, delete "and is" and insert -- is --, therefor.

In Column 35, Line 11, delete "solutions" and insert -- solutions are --, therefor.

In Column 35, Line 30, delete "also" and insert -- also be --, therefor.

In Column 35, Line 31, delete "solutions utilizing" and insert -- solutions --, therefor.

In Column 36, Line 32, delete "that it" and insert -- it --, therefor.

In Column 37, Line 5, delete "described" and insert -- described in --, therefor.

In Column 37, Line 24, delete "messages to" and insert -- messages --, therefor.

In Column 37, Line 55, delete "is at." and insert -- at. --, therefor.

In Column 38, Line 3, delete "in" and insert -- is --, therefor.

In the Claims

In Column 40, Line 34, in Claim 1, delete "(NB-IOT)" and insert -- (NB-IoT) --, therefor.

In Column 40, Line 37, in Claim 1, delete "NB-IOT" and insert -- NB-IoT --, therefor.

In Column 40, Line 39, in Claim 1, delete "NB-IOT" and insert -- NB-IoT --, therefor.

In Column 40, Line 42, in Claim 1, delete "NB-IOT" and insert -- NB-IoT --, therefor.

In Column 40, Line 43, in Claim 1, delete "NB-IOT" and insert -- NB-IoT --, therefor.

In Column 40, Line 45, in Claim 1, delete "NB-IOT" and insert -- NB-IoT --, therefor.

In Column 40, Line 49, in Claim 1, delete "NB-IOT" and insert -- NB-IoT --, therefor.

In Column 40, Line 53, in Claim 1, delete "NB-IOT" and insert -- NB-IoT --, therefor.

In Column 40, Line 56, in Claim 1, delete "NB-IOT" and insert -- NB-IoT --, therefor.

In Column 41, Line 3, in Claim 6, delete "(NB-IOT)" and insert -- (NB-IoT) --, therefor.

In Column 41, Line 6, in Claim 6, delete "NB-IOT" and insert -- NB-IoT --, therefor.

In Column 41, Line 8, in Claim 6, delete "NB-IOT" and insert -- NB-IoT --, therefor.

CERTIFICATE OF CORRECTION (continued)
U.S. Pat. No. 12,069,045 B2

In Column 41, Line 16, in Claim 6, delete "NB-IOT" and insert -- NB-IoT --, therefor.

In Column 41, Line 17, in Claim 6, delete "NB-IOT" and insert -- NB-IoT --, therefor.

In Column 41, Line 19, in Claim 6, delete "NB-IOT" and insert -- NB-IoT --, therefor.

In Column 41, Line 20, in Claim 6, delete "NB-Iot" and insert -- NB-IoT --, therefor.

In Column 42, Line 1, in Claim 6, delete "NB-IOT" and insert -- NB-IoT --, therefor.

In Column 42, Line 5, in Claim 6, delete "NB-IOT" and insert -- NB-IoT --, therefor.

In Column 42, Line 8, in Claim 6, delete "NB-IOT" and insert -- NB-IoT --, therefor.